(12) United States Patent
Kaneko et al.

(10) Patent No.: US 8,041,153 B2
(45) Date of Patent: Oct. 18, 2011

(54) PROCESSING DEVICE, PROCESSING METHOD AND COMPUTER READABLE MEDIUM

(75) Inventors: Yasuhiko Kaneko, Kanagawa (JP); Junichi Kaneko, Kanagawa (JP); Satoshi Yamamoto, Kanagawa (JP); Michitaka Hariya, Kanagawa (JP); Takashi Nagao, Kanagawa (JP); Yukio Kumazawa, Kanagawa (JP); Noriaki Seki, Kanagawa (JP)

(73) Assignees: Fuji Xerox Co., Ltd., Tokyo (JP); FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/006,549

(22) Filed: Jan. 14, 2011

(65) Prior Publication Data

US 2011/0109637 A1   May 12, 2011

Related U.S. Application Data

(62) Division of application No. 11/446,127, filed on Jun. 5, 2006, now Pat. No. 7,916,974.

(30) Foreign Application Priority Data

Jun. 3, 2005   (JP) ................................ 2005-164207

(51) Int. Cl.
*G06K 9/60* (2006.01)
(52) U.S. Cl. .............................. 382/303; 700/4; 708/233
(58) Field of Classification Search .................. 382/100, 382/303, 304; 700/4, 5, 8; 708/233, 234
See application file for complete search history.

(56) References Cited

U.S. PATENT DOCUMENTS

| | | | |
|---|---|---|---|
| 4,253,148 A | | 2/1981 | Johnson et al. |
| 4,319,338 A | * | 3/1982 | Grudowski et al. ............ 710/109 |
| 4,837,735 A | * | 6/1989 | Allen et al. ...................... 706/10 |
| 5,103,391 A | * | 4/1992 | Barrett .............................. 700/4 |
| 5,307,478 A | | 4/1994 | Rasbold et al. |
| 5,365,521 A | * | 11/1994 | Ohnishi et al. ................. 370/352 |
| 5,396,616 A | | 3/1995 | Venable |
| 5,420,941 A | | 5/1995 | Capo et al. |
| 5,557,795 A | | 9/1996 | Venable |
| 5,649,088 A | | 7/1997 | Hauck et al. |
| 5,701,479 A | | 12/1997 | Venable et al. |
| 5,995,996 A | | 11/1999 | Venable |
| 6,044,166 A | | 3/2000 | Bassman et al. |
| 6,141,769 A | * | 10/2000 | Petivan et al. ................... 714/10 |
| 6,286,026 B1 | | 9/2001 | Venable et al. |
| 6,292,168 B1 | | 9/2001 | Venable et al. |
| 6,407,808 B2 | | 6/2002 | Yoda et al. |
| 6,587,909 B1 | * | 7/2003 | Olarig et al. ................... 710/302 |
| 6,975,312 B2 | * | 12/2005 | Kim .............................. 345/211 |
| 7,344,402 B2 | | 3/2008 | Langgood et al. |
| 7,691,503 B2 | | 4/2010 | Wallace et al. |

(Continued)

FOREIGN PATENT DOCUMENTS

JP   7-105020 A   4/1995
JP   2003-281517 A   10/2003

*Primary Examiner* — Anand Bhatnagar
(74) *Attorney, Agent, or Firm* — Sughrue Mion, PLLC

(57) ABSTRACT

A processing device has plural processing modules executing a processing; and plural connectors each having a linking section, an associating section, and a controller. The linking section is able to link with at least one other connector at an input side or an output side. The associating section associates the connector with one of the processing modules. In accordance with a linked state, the controller controls the processing module associated by the associating section.

7 Claims, 29 Drawing Sheets

U.S. PATENT DOCUMENTS

| | | |
|---|---|---|
| 2003/0113031 A1 | 6/2003 | Wal |
| 2004/0041840 A1 | 3/2004 | Green et al. |
| 2004/0078093 A1* | 4/2004 | Fujii et al. .................. 700/2 |
| 2005/0030321 A1 | 2/2005 | Anwar |
| 2006/0190705 A1 | 8/2006 | Baxter et al. |
| 2007/0150877 A1 | 6/2007 | Emmett et al. |

* cited by examiner

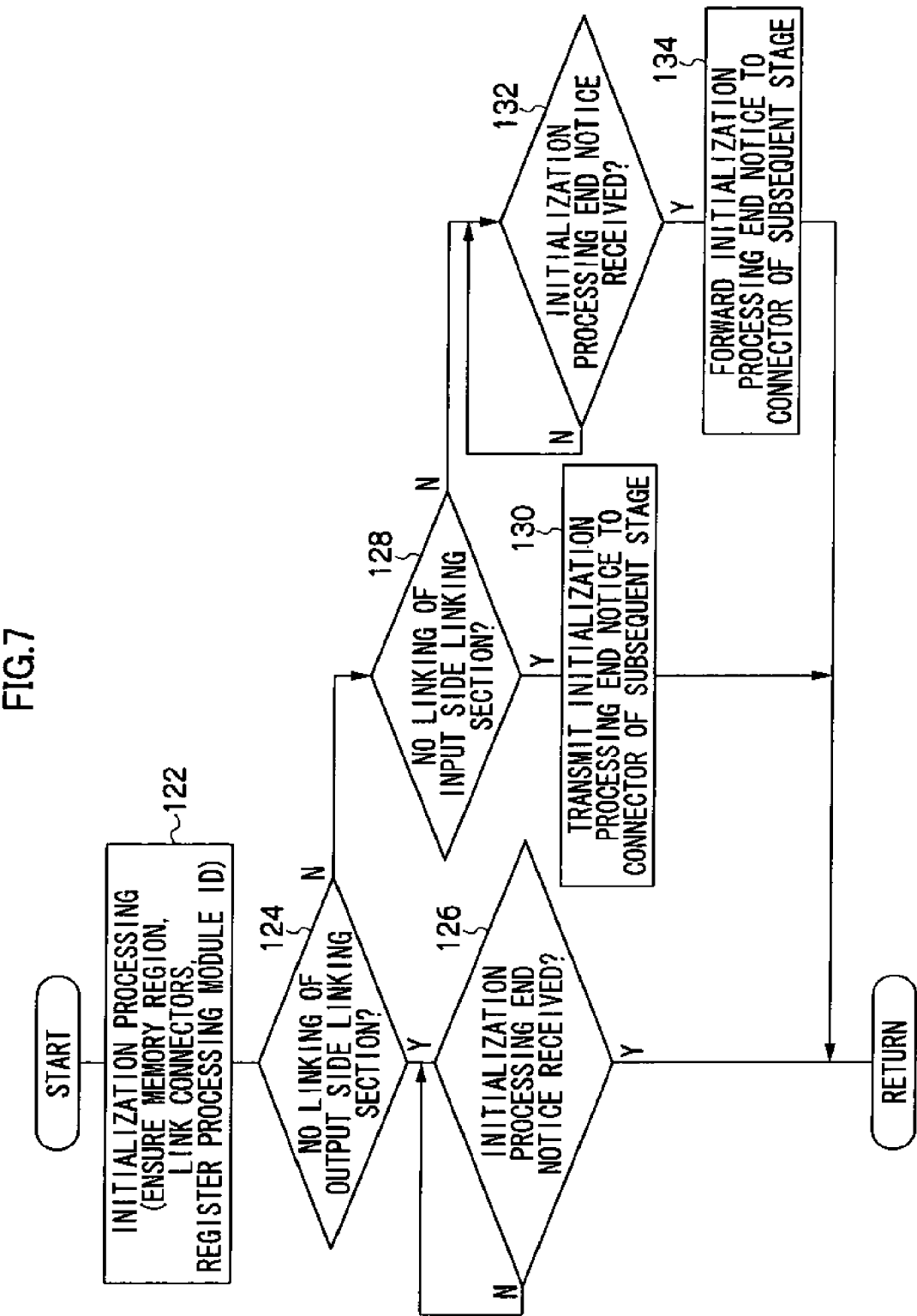

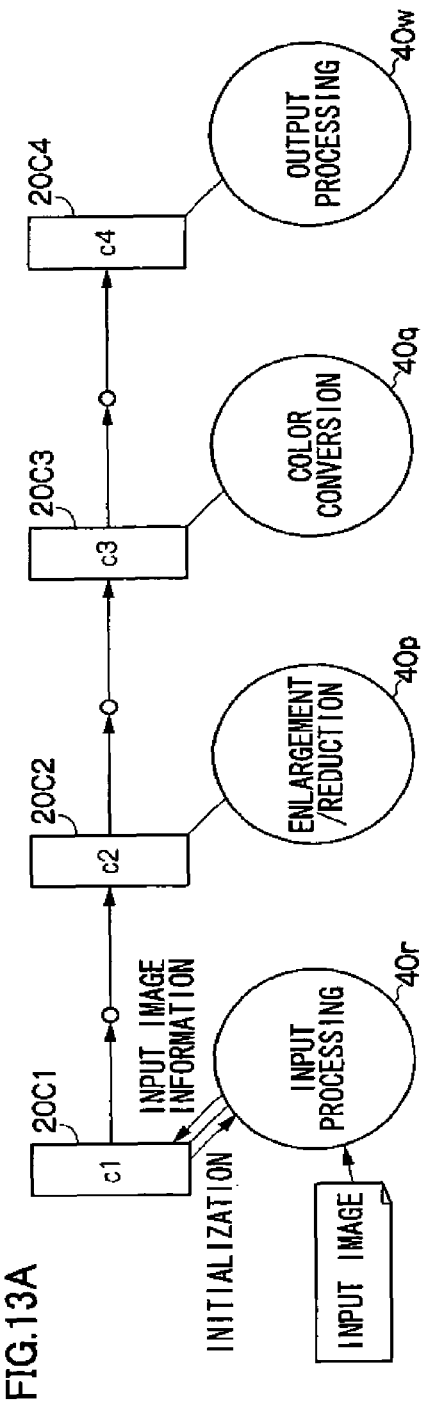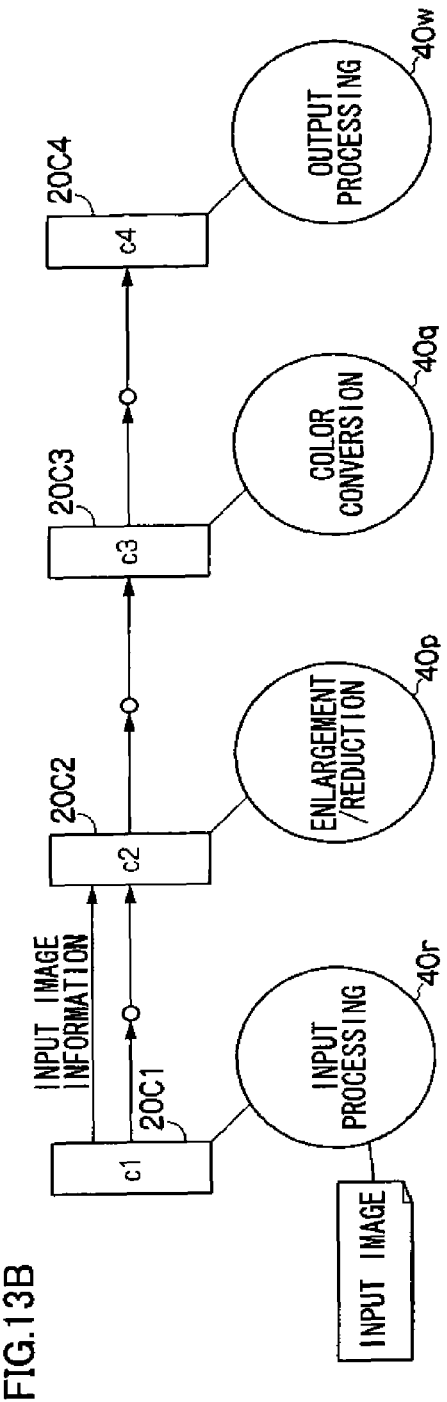

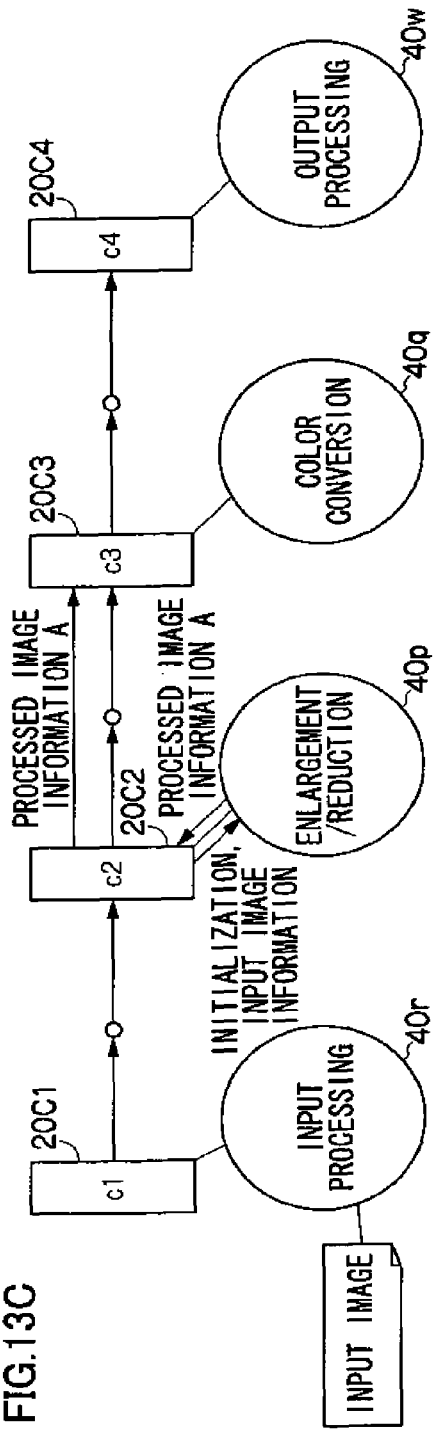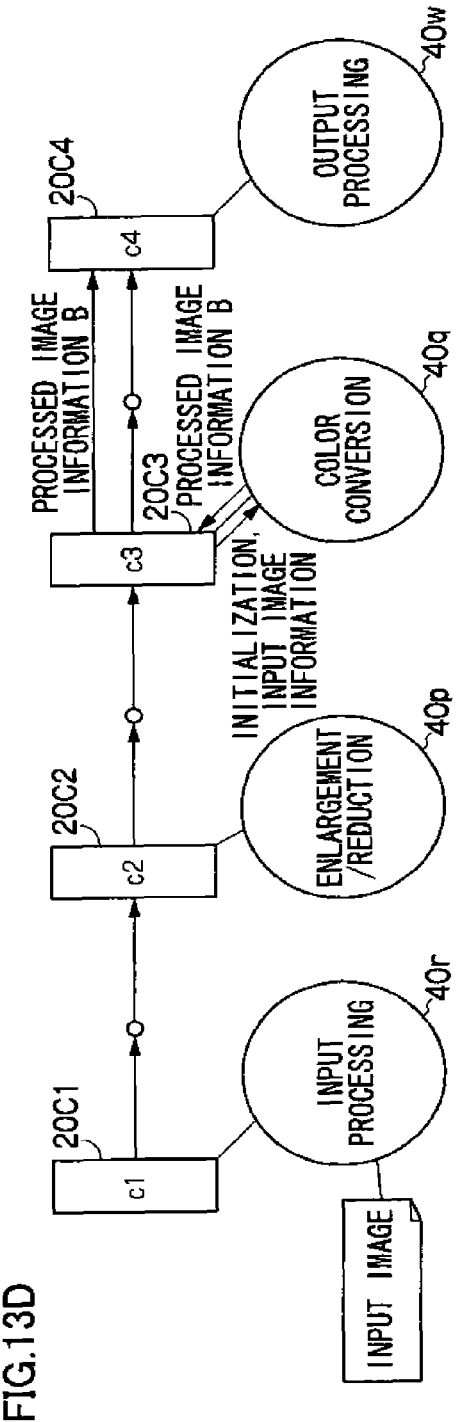

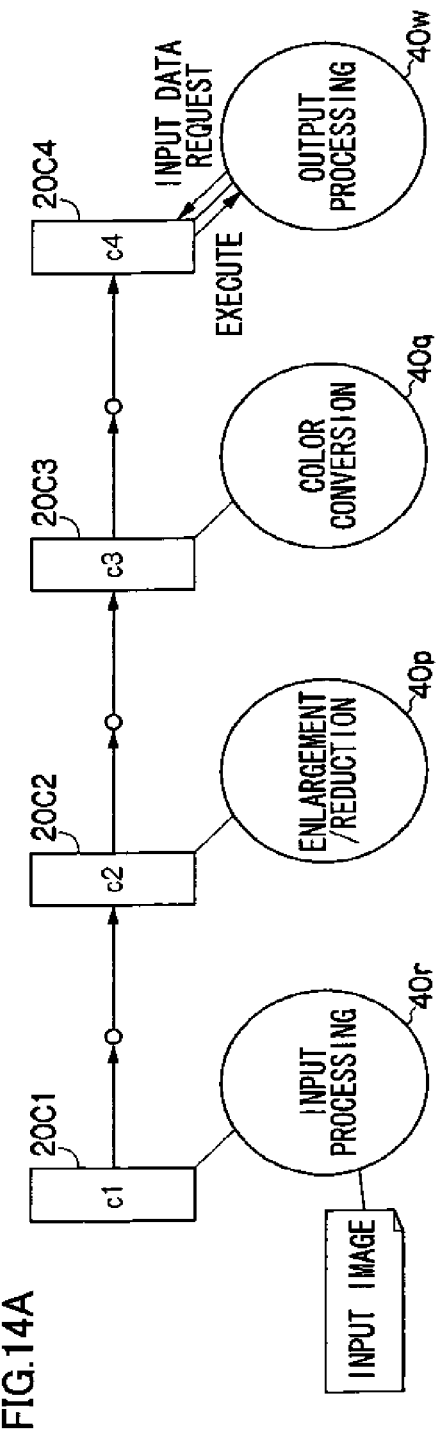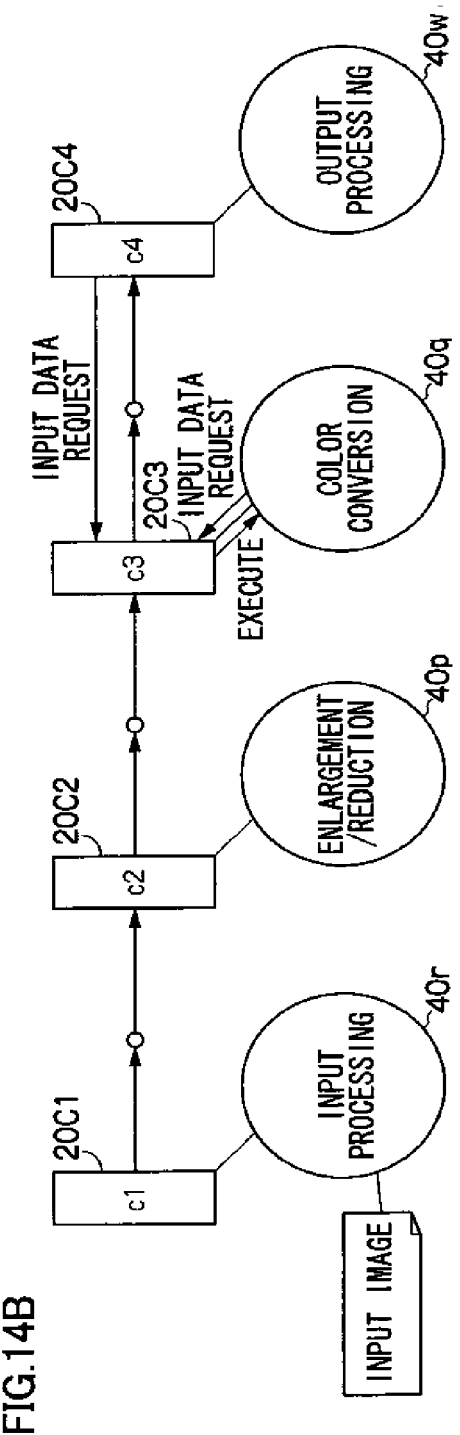

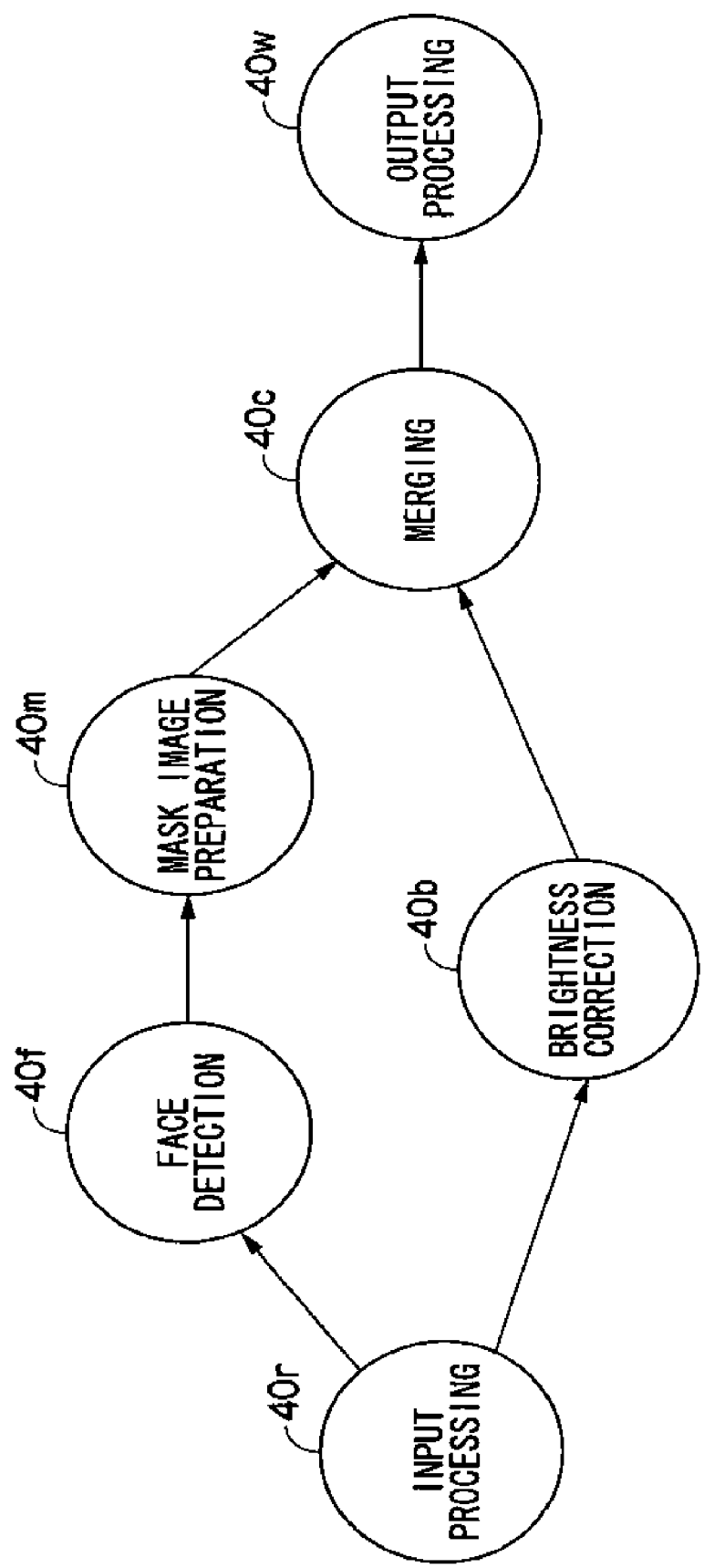

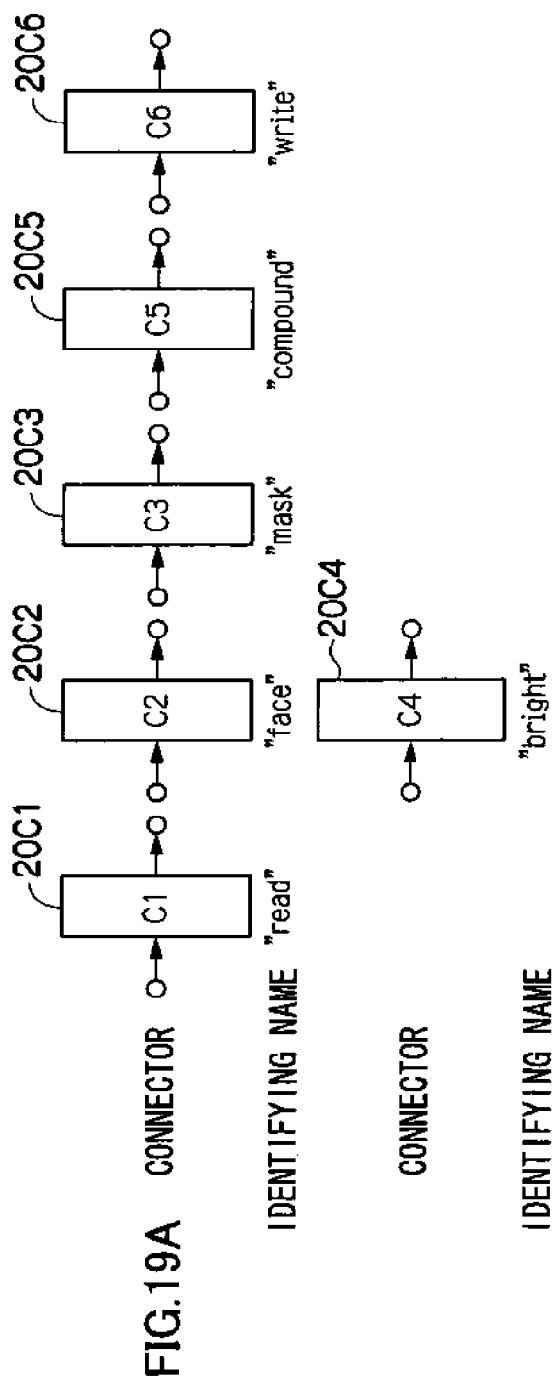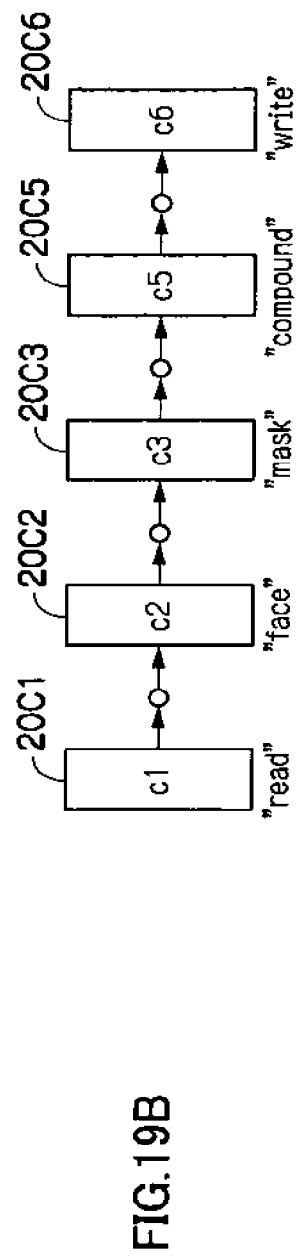
FIG.19A
FIG.19B

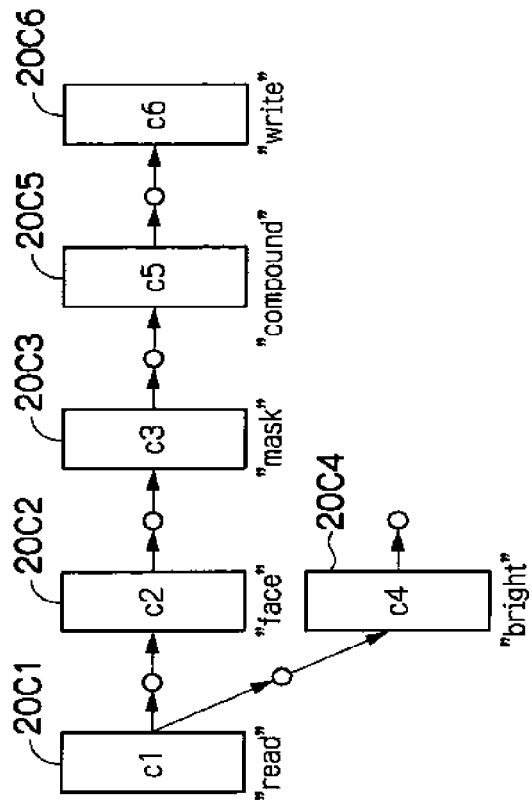
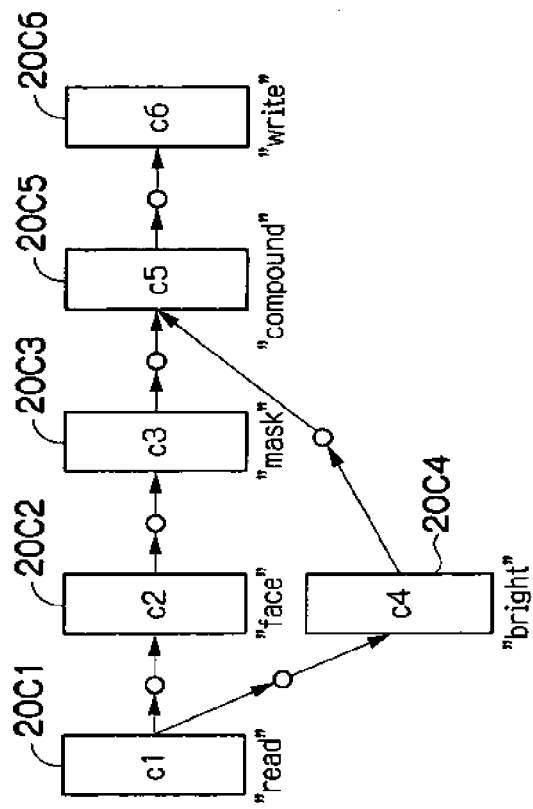
FIG.20A
FIG.20B

PROCESSING DEVICE, PROCESSING METHOD AND COMPUTER READABLE MEDIUM

This application is a divisional of U.S. application Ser. No. 11/446,127, filed Jun. 5, 2006, which claims priority under 35 USC 119 from Japanese Patent Application No. 2005-164207, filed Jun. 3, 2005, each of which is incorporated by reference herein in its entirety.

BACKGROUND

1. Technical Field

The present invention relates to a processing device, a processing method and a computer readable medium which build a connected relationship in order to execute, in order, plural processing modules which structure a system of a series of processing.

2. Related Art

Conventionally, there have been known pipelining image processing systems which, after linking necessary processing modules in the form of a pipeline and in a desired order, carry out initialization and processing, thereby carrying out a series of image processing.

SUMMARY

The present invention has been made in view of the above circumstances, and provides a processing device, a processing method and a computer readable medium.

According to an aspect of the invention, there is provided a processing device including: plural processing modules executing a processing; and plural connectors each having a linking section able to link with at least one other connector at an input side or an output side, an associating section for associating the connector with one of the processing modules, and a controller recognizing a linked state with other connectors and, in accordance with the linked state, controlling the processing module associated by the associating section.

BRIEF DESCRIPTION OF THE DRAWINGS

Preferred embodiments of the present invention will be described in detail based on the following figures, wherein:

FIG. 7 is a flowchart showing the flow of an initialization processing subroutine in a pipeline method;

FIGS. 13A through 13E are diagrams schematically showing the order of execution in a case in which the processing modules of the processing system of FIG. 10 are executed in the bucket-relay method;

FIGS. 14A through 14E are diagrams schematically showing the order of execution in a case in which the processing modules of the processing system of FIG. 10 are executed in the pipeline method;

FIG. 18 is a diagram schematically showing an example of an image processing system in which branching and merging structures are included;

FIGS. 19A and 19B are diagrams schematically showing the procedures of building a linked structure of the image processing system shown in FIG. 18;

FIGS. 20A and 20B are diagrams schematically showing the procedures of building a linked structure of the image processing system shown in FIG. 18;

DETAILED DESCRIPTION

Exemplary embodiments of the present invention will be described in detail hereinafter with reference to the drawings.

Figure 1:
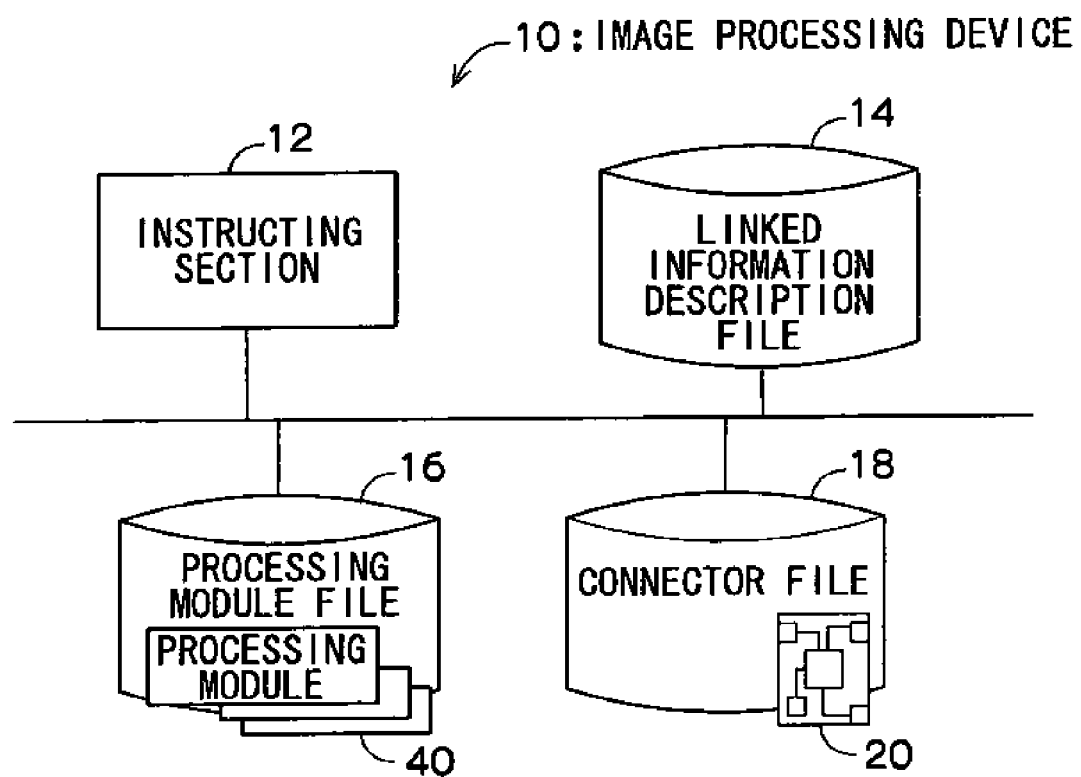
FIG. 1 is a block diagram functionally showing the structure of a processing device relating to exemplary embodiments of the present invention.

FIG. 1 is a block diagram functionally showing the structure of a processing device 10 which carries out a series of processing by using a connector which is structured by software and which relates to exemplary embodiments of the present invention. The processing device 10 links plural processing modules 40, which carry out predetermined processing on data which is the object of processing and execute a series of processing, by connectors 20. Note that, in the present embodiment, description is given by using as an example a case in which the connectors 20 and the processing modules 40 are respectively structured by program modules. However, some or all of the connectors 20 and the processing modules 40 may be structured by hardware exclusively used therefor. Further, the connectors 20 and the modules 40 may be modules which function as a thread, or may be modules which function as a process.

As shown in FIG. 1, the processing device 10 has an instructing section 12 for inputting a linking execution instruction which links the plural processing modules 40 and causes execution of processing; a linked structure description file 14 which stores information of linked structures of the processing modules 40 and information associating the connectors 20 and the processing modules; a processing module file 16 which stores the plural processing modules 40; and a connector file 18 which stores basic models of the connectors 20.

Linking information, which expresses how the plural processing modules 40 are to be linked, is included in the linking execution instruction inputted to the instructing section 12. When a linking execution instruction is inputted to the instructing section 12, on the basis of the linking information included in this linking execution instruction, the processing modules 40 of the processing module file 16 and the basic models of the connectors 20 of the connector file 18 are used, and generation of the connectors 20 corresponding to the respective processing modules 40 and building of the linked structure are carried out.

Figure 2:
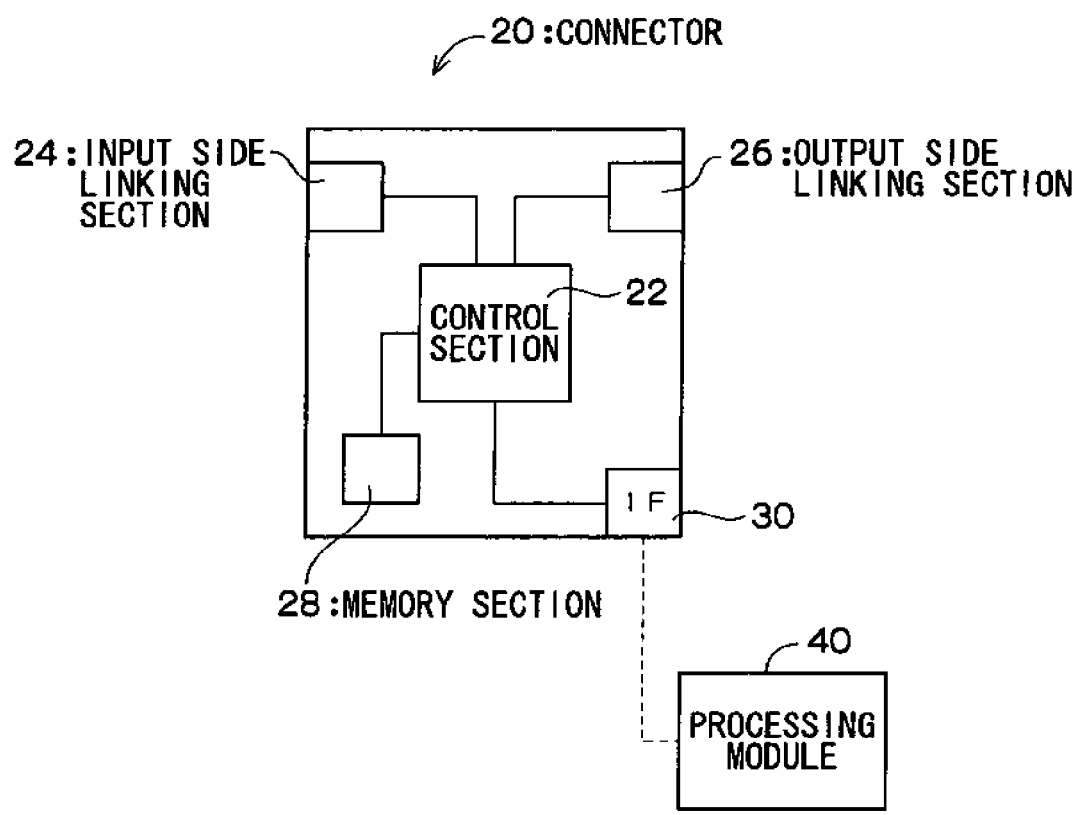
FIG. 2 is a block diagram showing the functional structure of a connector stored in a connector file.

FIG. 2 is a block diagram showing the functional structure of the connector 20 which serves as a basic model and which is stored in the connector file 18. As shown in FIG. 2, the connector 20 has a control section 22 which controls the starting-up/ending control of the processing module 40 associated with the connector 20, and controls the overall operation of the connector 20. The connector 20 also has an input side linking section 24 and an output side linking section 26. At the time of the initialization processing of the connector 20 which is to be included in the linked structure, the output side linking section 26 of another connector 20 is connected to the input side linking section 24, and the input side linking section 24 of another connector 20 is connected to the output side linking section 26. When the connector 20 is to be at the head of the linked structure, at the time of the initialization processing, the input side linking section 24 thereof is invalidated (is set in a state in which there is no connected relationship with another connector, i.e., NULL setting). When the connector 20 is to be at the final end of the linked structure, at the time of the initialization processing, the output side linking section 26 thereof is invalidated. Further, the numbers of the input side linking sections 24 and the output side linking sections 26 can be set by being defined.

A memory section 28 is connected to the control section 22. An ID region, which registers an ID which is identification information of the processing module 40 associated with that connector 20, and a status region, which holds the status of the associated processing module 40, are ensured in the memory section 28. One processing module 40 can be associated with one connector 20 (i.e., one ID of the processing module 40 can be registered in the ID region of the memory section 28). Via an interface (IF) 30, the control section 22 controls the processing module 40 expressed by the ID which is stored in the memory section 28. Note that a common interface is used for all of the connectors 20 and processing modules 40. Accordingly, the associating of the processing module 40 is easy, and changing thereof also is easy.

NULL can be set in the ID region. When NULL is set, because no processing module 40 is associated with the connector 20, the processing module 40 is not executed at that connector 20. By setting NULL in the ID region in this way, it is possible to, as needed, skip an unnecessary processing among the linked series of processing. Note that, in the present exemplary embodiment, NULL is not set in the ID region of the lead connector and the ID region of the final end connector in the linked structure.

In this way, the connector 20, which serves as a basic model and which is stored in the connector file 18, is a connector at which one input side linking section 24 and one output side linking section 26 are defined. In the present exemplary embodiment, when a linking execution instruction is inputted from the instructing section 20, a number of the connectors 20, which is equal to the number of processing modules to be linked, are generated by using the connectors 20 which serve as basic models and which are stored in the connector file 18. Further, the numbers of the input side linking sections 24 and the output side linking sections 26 of the generated connectors 20 are defined in accordance with the linked structure. For example, in a case in which plural processing modules 40 branch-off from a single processing module 40 and are executed in parallel, when the connector 20 which is associated with the processing module 40 which is the source of the branching is generated, the number of output side linking sections 26 of that connector 20 is defined as the number of the processing modules 40 which are to be executed in parallel. After the numbers of the input side linking sections 24 and the output side linking sections 26 are defined, the linked structure with the other connectors 20 is built.

Figure 3:
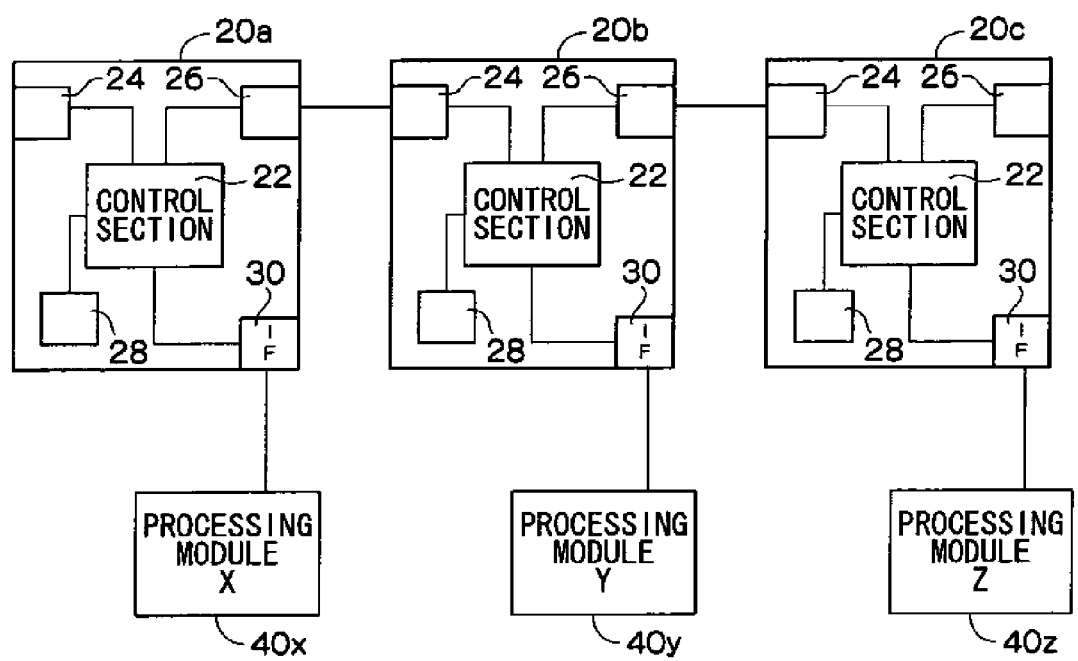
FIG. 3 is a diagram showing an example of a linked structure which is built in a case in which a linking execution instruction, which links three processing modules in series and causes a series of processing to be carried out, is inputted via an instructing section.

FIG. 3 is a diagram showing an example of a linked structure which is built in a case in which a linking execution instruction, which links three processing modules in series and causes a series of processing to be carried out, is inputted via the instructing section 12.

First, the generation of connectors $20a$, $20b$, $20c$, which correspond to three processing modules $40x$, $40y$, $40z$ for which execution in continuation is desired, is instructed via the instructing section 12. Further, arbitrary identifying names are set for the generated connectors $20a$, $20b$, $20c$ from the instructing section 12. Next, the linked structure is defined via the instructing section 12. At this time, the numbers of input side linking sections 24 and output side linking sections 26 of the respective connectors $20a$, $20b$, $20c$ are defined. Here, because there is a series structure in which the series of processing does not include a branching or a merging structure, the numbers of input side linking sections 24 and output side linking sections 26 (one each) defined at the connector 20 which is the basic model are used as is.

After the linked structure is defined, the association of the processing modules $40x$, $40y$, $40z$ with respect to the connectors $20a$, $20b$, $20c$ is defined.

Note that the method for instructing the defining of the linked structure of the connectors, the defining of the numbers of the input side linking sections 24 and output side linking sections 26, the setting of the identifying names, and the associating of the processing modules, is not particularly limited. For example, in a case in which the instructing section 12 is structured by a GUI (graphical user interface), the defining of the linked structure and the associating of the processing modules may be carried out by operations such as a user dragging and placing, in an instruction area of the GUI, icons representing the connectors 20 and icons representing the processing modules 40, or the like. Further, a structure is possible in which the numbers of the input side linking sections 24 and output side linking sections 26 and the identifying names can be, for example, directly inputted from an input device such as a keyboard or the like, or can be selected from among a list of identifying names.

Or, information of the linked structure, which is stored in advanced in a predetermined memory device, or the like may be called-up from the instructing section 12 and used.

After the linked structure and the associations have been defined in this way, when the linking execution instruction for building the linked structure of the processing modules and causing execution of the processing modules is actually inputted, the three connectors 20a, 20b, 20c judge the linking information (the respective information defined in the above description) which is included in the linking execution instruction, and build the linked structure, and execute the processing of the processing modules 40 in the optimal order.

Concretely, first, the connectors 20a, 20b, 20c are linked in accordance with the linking execution instruction. Specifically, the output side linking section 26 of the connector 20a and the input side linking section 24 of the connector 20b are connected, and the output side linking section 26 of the connector 20b and the input side linking section 24 of the connector 20c are connected. This connection is carried out by, after setting at least one of the input side linking section 24 and the output side linking section 26 at each connector, setting, at the input side linking section 24 and the output side linking section 26 of each of the connectors 20a, 20b, 20c, the identifying name of the other connector which is to be connected. Note that, because the connector 20a is to be the lead connector, NULL is set at the input side linking section 24 thereof, and, because the connector 20c is to be the final end connector, NULL is set at the output side linking section 26 of the connector 20c.

Further, the processing module X 40x, the processing module Y 40y, and the processing module Z 40z are associated with the respective connectors 20a, 20b, 20c. Specifically, association is carried out by registering the respective IDs of the processing module X 40x, the processing module Y 40y, and the processing module Z 40z in the ID regions of the memory sections 28 of the connectors 20a, 20b, 20c, respectively.

Note that, when setting the particular parameters of the respective processing modules 40x, 40y, 40z which are needed for the execution thereof, the setting is carried out via interfaces which are particular to the processing modules, separately from the above-described linking processing and associating processing.

After the linking processing and associating processing have ended in this way, the respective connectors 20a, 20b, 20c judge the linked states with the other connectors, and execute the processing modules 40x, 40y, 40z in the optimal order of execution.

In the case of a bucket-relay method in which the processing modules are executed in order from the preceding connectors and the data after the processing is sent to the connector of the subsequent stage and the processing are carried out in order, first, the control section 22 of the connector 20a which is the lead connector causes the associated processing module X 40x to execute processing. The connector 20a transmits the processing results of the processing module X 40x to the connector 20b. The connector 20b sends the processing results from the connector 20a to the processing module Y 40y, and causes the processing module Y 40y to execute processing. The connector 20b transmits the processing results of the processing module Y 40y to the connector 20c. The connector 20c sends the processing results from the connector 20b to the processing module Z 40z, and causes the processing module Z 40z to execute processing. In this way, the processing modules 40x, 40y, 40z, which are linked via the connectors 20a, 20b, 20c, are executed in the optimal order.

Further, the aspect of the present invention is not limited to the bucket-relay method, and the series of processing may be executed in accordance with a pipeline method in which the processing modules are executed from the final end connector (the connector 20c in FIG. 3), and the processing module as needed requests the connector of the preceding stage for data which is the object of processing. The pipeline method is particularly effective in cases in which the respective units of processing of the processing modules 40 which are linked together are different. For example, in a processing system which carries out image processing of image data, there are cases in which the image data which is the object of processing is processed at each of the processing modules 40 in a different unit of processing such as "line units", "surface units", "byte block units", or the like. Accordingly, in such cases, by utilizing the pipeline method in which the required data can be requested from the processing module 40 per data unit which can be processed, control of execution of the series of processing is easy.

In the processing device 10, whether processing are to be executed by the bucket-relay method or whether processing are to be executed by the pipeline method can be set in advance via the instructing section 12. The respective connectors 20 are operated in accordance with the method which is set in advance.

Figure 4:
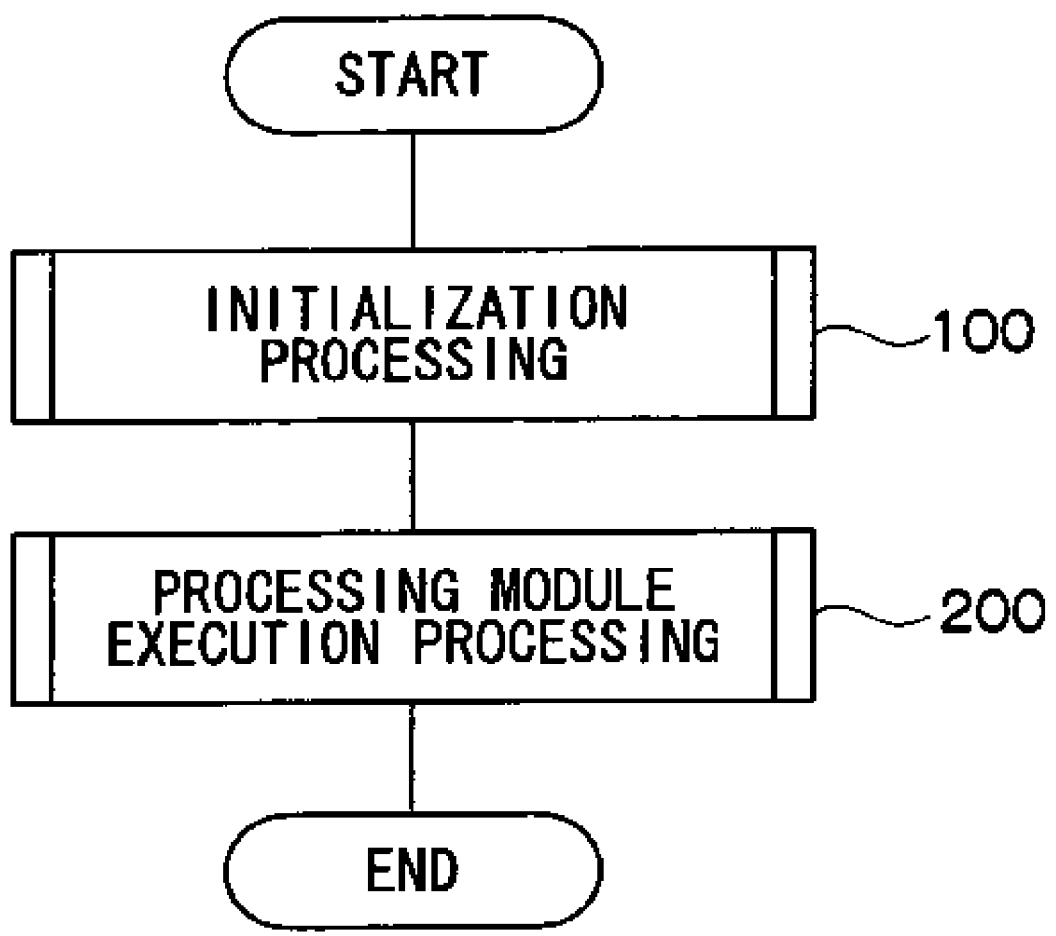
FIG. 4 is a flowchart showing the flow of processing executed at respective connectors which are generated in accordance with a linking execution instruction.

FIG. 4 is a flowchart showing the flow of processing executed at each of the connectors 20 which are generated in accordance with the linking execution instruction.

In step 100, an initialization processing subroutine is executed. In the initialization processing subroutine, the building of the linked structure of the respective connectors 20 and the associating of the processing modules 40 are carried out. After the initialization processing subroutine ends, in step 200, a processing module execution processing subroutine, which executes the respective processing modules 40, is executed.

Figure 5:
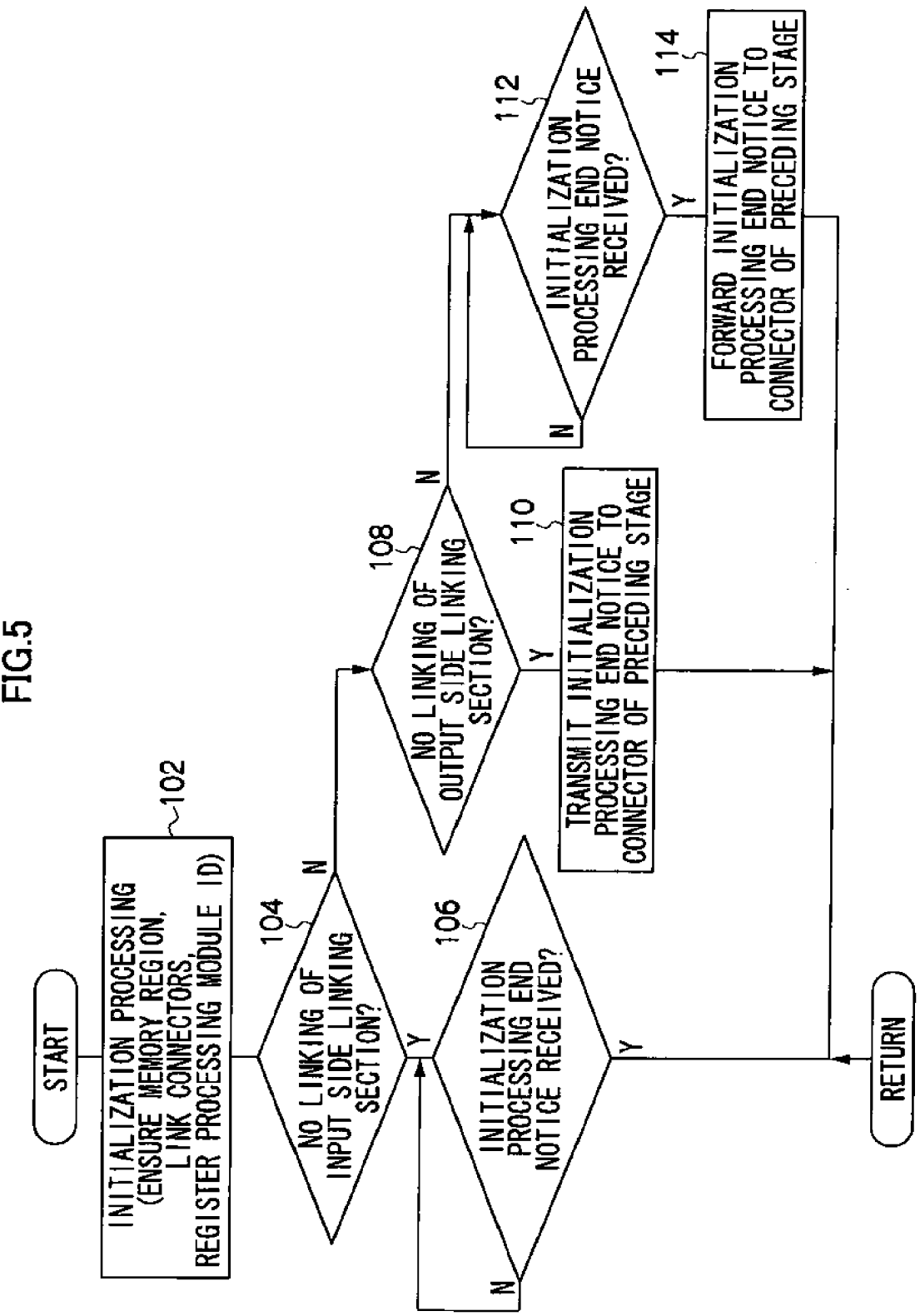
FIG. 5 is a flowchart showing the flow of an initialization processing subroutine in a bucket-relay method.

FIG. 5 is a flowchart showing the flow of the initialization processing subroutine in the bucket-relay method. In step 102, the following processing are carried out as the initialization processing. First, the ID region, in which the ID of the processing module 40 is to be registered, and the status region, which stores the status of the processing module 40 registered in the ID region, are ensured in the memory section 28, and the ID of the processing module 40 which is associated with that connector 20 is registered in the ID region. This ID is included in the linking information of the linking execution instruction. Due to the ID of the processing module 40 being registered in the ID region, the processing module 40 is associated with the connector 20 itself. Simultaneously with this associating, the linked relationships with the other connectors 20 are built on the basis of the linking information included in the linking execution instruction. Specifically, the identifying names of the other connectors are set at the input side linking section 24 and the output side linking section 26. However, in a case in which the connector 20 is the lead connector, NULL is set at the input side linking section 24. In a case in which the connector 20 is the final end connector, NULL is set at the output side linking section 26. After the building of the linked structure and the associating of the processing modules 40 have ended, information of this linked structure and information of the associations are written to the linked structure description file.

In step 104, it is judged whether or not another connector 20 is linked to the input side linking section 24 (i.e., whether or not NULL is set). If it is judged here that another connector 20 is not linked to the input side linking section 24, the connector 20 can judge that it itself is the lead connector, and in step 106, the connector 20 waits for receipt of an initialization ended notice from the connector 20 of the subsequent stage (the connector 20 which is linked to the output side linking section 26). When an initialization ended notice is received in step 206, the initialization processing subroutine ends.

Further, if it is judged in step 104 that another connector 20 is linked to the input side linking section 24, in step 108, it is judged whether or not another connector 20 is linked to the output side linking section 26. If it is judged here that another connector 20 is not linked to the output side linking section 26, the connector 20 can judge that it itself is the final end connector, and in step 110, the connector 20 transmits an initialization ended notice to the connector of the preceding stage (the connector 20 linked to the input side linking section 24).

In step 108, if it is judged that another connector 20 is linked to the output side linking section 26, the connector 20 can judge that it itself is not the lead connector nor the final end connector, i.e., can judge that it itself is a connector positioned at an intermediate portion of the linked structure. Therefore, in step 112, the connector 20 waits for receipt of an initialization ended notice from the final end connector. When an initialization ended notice is received, in step 114, the received initialization ended notice is forwarded to the connector 20 of the preceding stage.

Namely, the initialization ended notice which is transmitted from the final end connector is forwarded via the respective linked connectors to the lead connector. In this way, the lead connector can grasp that initialization processing has been completed at all of the linked connectors, and start of execution of the processing module 40 is possible.

Figure 6:
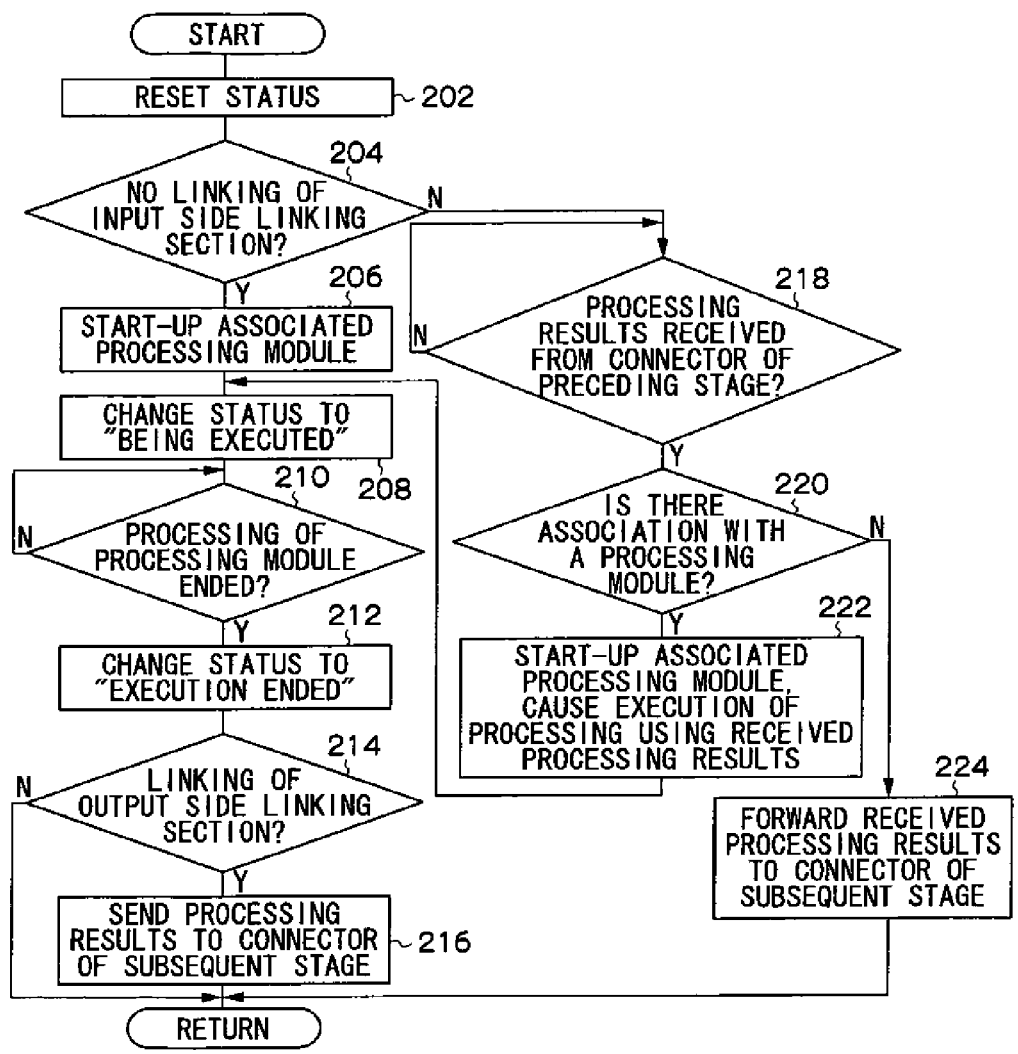
FIG. 6 is a flowchart showing the flow of a processing module execution processing subroutine in the bucket-relay method.

After the initialization processing subroutine ends, the processing module execution processing subroutine is executed. FIG. 6 is a flowchart showing the flow of the processing module execution processing subroutine in the bucket-relay method. In step 202, the status region of the memory section 28 is reset. As described previously, the status region is the region for holding the status of the processing module 40 which is associated with that connector 20. Here, an identifier expressing "before start of execution" is stored in the status region.

In step 204, it is judged whether or not another connector 20 is linked to the input side linking section 24 (i.e., whether or not NULL is set). If it is judged here that another connector 20 is not linked to input side linking section 24, the connector 20 can judge that it itself is the lead connector. In step 206, the connector 20 sends an initialization instruction to the processing module 40 associated with itself, and, after initialization, processing of the processing module 40 begins.

In step 208, because processing of the processing module 40 has begun, the identifier held in the status region is changed to an identifier expressing "currently executing".

In step 210, it is judged whether or not the processing of the processing module 40 has ended. If processing results or a processing ended notice have been received from the processing module 40, it can be judged the processing has ended. When it is judged in step 210 that processing has ended, in step 212, the identifier held in the status region is changed to an identifier expressing "execution ended".

In step 214, it is judged whether or not another connector 20 is linked to the output side linking section 26 (i.e., whether or not NULL is set). Here, if another connector 20 is linked to the output side linking section 26, the processing results of the processing module 40 are sent to the connector 20 of the subsequent stage (the connector 20 linked to the output side linking section 26). Further, if it is judged in step 214 that another connector 20 is not linked to the output side linking section 26, the processing module execution processing routine ends without the processing of step 216 being carried out.

On the other hand, if it is judged in step 204 that another connector 20 is linked to the input side linking section 24, the connector 20 can judge that it itself is a connector other than the lead connector. The routine moves on to step 218 where the connector 20 waits for processing results from the connector of the preceding stage (the connector 20 linked to the input side linking section 24). When it is judged in step 218 that processing results have been received, in step 220, it is judged whether or not there is an association with the processing module 40. Namely, it is judged whether the ID of the processing module 40 is registered in the ID region of the memory section 28 (there is an association), or whether NULL is set (there is no association).

If it is judged here that the ID of the processing module 40 is registered in the ID region, in step 222, an initialization instruction is sent to that registered (associated) processing module 40 and initialization is carried out. Thereafter, the processing module 40 is made to execute processing using the processing results received from the connector 20 of the preceding stage. After step 222, the routine proceeds to step 208, and processing are executed in the same way as described above.

Further, if it is judged in step 220 that NULL is set in the ID region (i.e., that there is no association with the processing module 40), in step 224, the received processing results are forwarded to the connector 20 of the subsequent stage.

Note that, in the present exemplary embodiment, because NULL is not set in the ID regions of the lead connector and the final end connector, in a case in which the connector 20 is the lead connector (i.e., in a case in which the judgment in step 204 is affirmative), the judgment as to whether there is or is not association with a processing module is omitted.

Here, explanation is given of an example of a case in which control is carried out such that the connector 20 does not start-up the processing module 40 associated with itself until the connector 20 receives processing results from the connector 20 of the preceding stage (refer to above-described step 218). However, the aspect of the present invention is not limited to the same. For example, control may be carried out such that the connector 20 does not start-up the processing module 40 until the "execution ended" identifier is stored in the status region of the connector 20 of the preceding stage. In this case, transmission and reception of the status is also carried out between the connectors 20, separately from the transmission and reception of the processing results.

A case in which processing are executed by the bucket-relay method has been described above as an example, but the processing can be executed by the pipeline method as well. In the pipeline method, the processing module 40 is started-up from the final end connector at which another connector 20 is not linked to the output side linking section 26. Therefore, processing can be carried out as follows.

FIG. 7 is a flowchart showing the flow of an initialization processing subroutine in the pipeline method. In step 122, initialization processing (the building of the linked structure and the associating of the processing modules 40) is carried out. Because this processing is similar to that in the case of the bucket-relay method (see step 102 of FIG. 5), description thereof is omitted.

In step 124, it is judged whether or not another connector 20 is linked to the output side linking section 26 (i.e., whether or not NULL is set). If it is judged here that another connector is not linked to the output side linking section 26, the connector 20 can judge that it itself is the final end connector. In step 126, the connector 20 waits for receipt of an initialization ended notice from the connector 20 of the preceding stage (the connector 20 linked to the input side linking section 24).

The initialization processing subroutine ends when an initialization ended notice is received here.

When it is judged in step 124 that another connector 20 is connected to the output side linking section 26, in step 128, it is judged whether or not another connector 20 is linked to the input side linking section 24. If it is judged here that another connector 20 is not linked to the input side linking section 24, the connector 20 can judge that it itself is the lead connector. In step 130, the connector 20 transmits an initialization ended notice to the connector of the subsequent stage (the connector 20 linked to the output side linking section 26).

Further, if it is judged in step 128 that another connector 20 is linked to the input side linking section 24, the connector 20 can judge that it itself is not the lead connector nor the final end connector, i.e., that it itself is a connector positioned at an intermediate portion of the linked structure. Therefore, in step 132, the connector 20 waits for receipt of an initialization ended notice from the lead connector. When an initialization ended notice is received, in step 134, the received initialization ended notice is forwarded to the connector 20 of the subsequent stage.

Namely, the initialization ended notice transmitted from the lead connector is forwarded via the respective linked connectors 20 to the final end connector. In this way, the final end connector can grasp that initialization processing has been completed at all of the linked connectors 20, and the start of execution of the processing module 40 is possible.

Figure 8A:
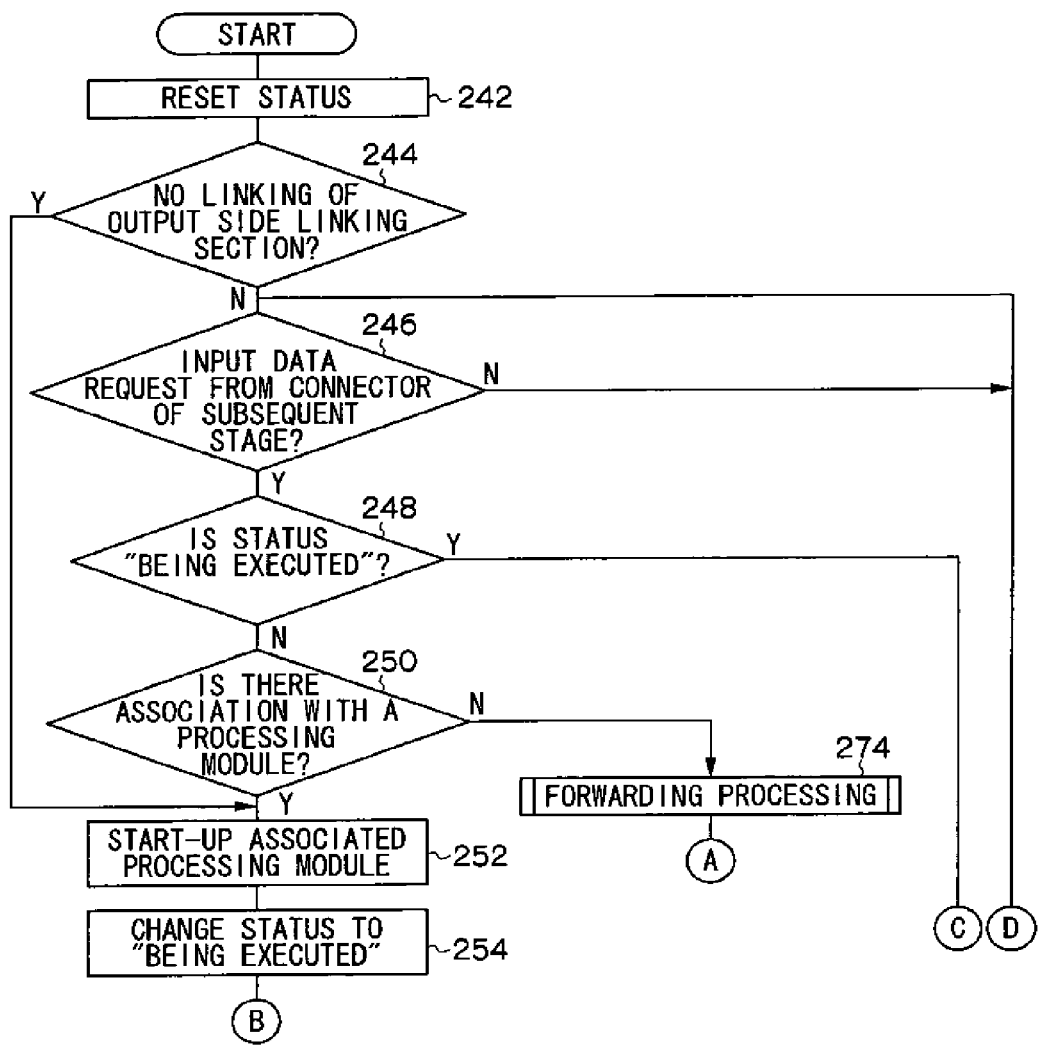
FIGS. 8A and 8B are flowcharts showing the flow of a processing module execution processing subroutine in the pipeline method.
Figure 8B:
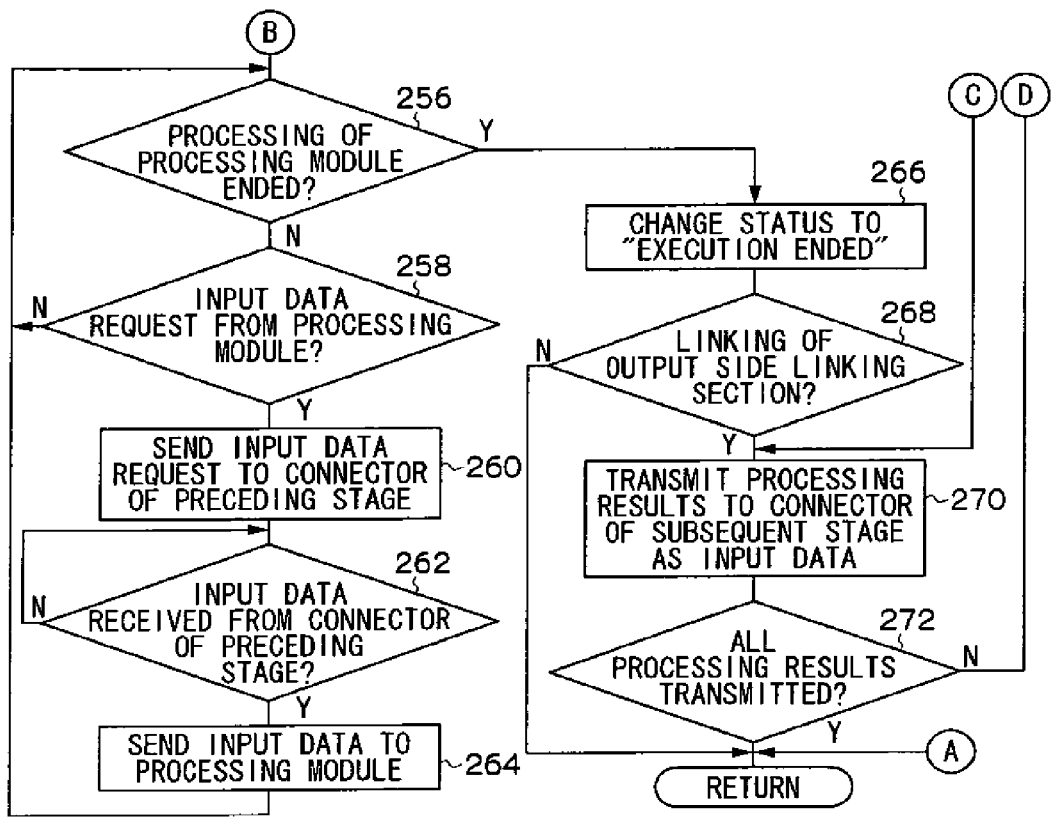

When the initialization processing subroutine has ended, the processing module execution processing subroutine is executed. FIG. 8 is a flowchart showing the flow of the processing module execution processing subroutine in the pipeline method. In step 242, the status region of the memory section 28 is reset. Specifically, an identifier expressing "before start of execution" is stored in the status region.

In step 244, it is judged whether or not another connector 20 is linked to the output side linking section 26 (i.e., whether or not NULL is set). If it is judged here that another connector 20 is not linked to output side linking section 26, the connector 20 can judge that it itself is the final end connector. In step 252, the connector 20 sends an initialization instruction to the processing module 40 associated with itself, initialization is carried out, and the processing of the processing module 40 begins.

In step 254, because processing of the processing module 40 has begun, the identifier held in the status region is changed to an identifier expressing "currently executing".

In step 256, it is judged whether or not the processing of the processing module 40 has ended. Here, if processing results from the processing module 40 have been received, it can be judged the processing has ended. If it is judged in step 256 that the processing of the processing module 40 has not yet ended, the routine moves on to step 258 where it is judged whether or not a request for input data (corresponding to the processing results or a portion of the processing results at the connector 20 of the preceding stage) has been received from the processing module 40. If it is judged in step 258 that an input data request has not been received, the routine returns to step 256.

Further, if it is judged in step 258 that an input data request has been received, in step 260, the input data request is sent to the connector of the preceding stage. In step 262, the connector 20 waits for input data from the connector of the preceding stage. When it is judged in step 262 that input data is received, in step 264, the input data is sent to the processing module 40. At the processing module 40 which has received the input data, processing can be executed by using that input data. Thereafter, the routine returns to step 256, and the processing of steps 256 through 264 are repeated until the processing of the processing module 40 ends.

Note that, when the processing module 40 processes, at one time, all of the data which is the object of processing in the series of processing, it suffices for the processing of steps 256 through 264 to be carried out one time. However, in a case in which, for example, processing is carried out in minutely-divided units of processing such as byte block units or the like, an input data request is outputted from the processing module 40 per that unit of processing. Therefore, the processing of steps 256 through 264 are carried out repeatedly until processing of all of the data which is the object of processing is completed.

When it is judged in step 256 that the processing of the processing module 40 has ended, in step 266, the identifier held in the status region is changed to an identifier expressing "execution ended".

In step 268, it is judged whether or not another connector 20 is linked to the output side linking section 26 (i.e., whether or not NULL is set).

If it is judged in step 268 that another connector 20 is not linked to the output side linking section 26, the connector 20 is the final end connector, and therefore, there is no need to transmit the processing results to another connector. Thus, the processing module execution processing subroutine ends.

On the other hand, if it is judged in step 268 that another connector 20 is linked to the output side linking section 26, the connector 20 can judge that it itself is a connector other than the final end connector, and that the processing module 40 was executed by receiving an input data request from the connector 20 of the subsequent stage in step 246. In step 270, the processing results, of an amount corresponding to the unit of processing, which were requested in the input data request are transmitted to the connector 20 of the subsequent stage as input data.

In step 272, it is judged whether or not all of the processing results are transmitted to the connector 20 of the subsequent stage.

If it is judged in step 272 that not all of the processing results are transmitted to the connector 20 of the subsequent stage, or if it is judged in step 244 that another connector 20 is not linked to the output side linking section 26, the routine moves on to step 246, and the connector 20 waits for an input data request from the connector 20 of the subsequent stage. When it is judged in step 246 that an input data request is received from the connector 20 of the subsequent stage, in step 248, it is judged whether or not the identifier expressing "execution ended" is held in the status region of the memory section 28. Namely, here, the connector 20 judges whether or not the processing of the processing module 40 associated with itself has been executed.

If it is judged in step 248 that the identifier expressing "execution ended" is not held in the status region of the memory section 28, in step 250, the connector 20 judges whether or not there is an association between the processing module 40 and itself. Namely, it is judged whether the ID of the processing module 40 is registered in the ID region (there is an association), or whether NULL is set (there is no association).

Here, if it is judged that the ID of the processing module 40 is registered in the ID region, the routine moves on to step 252 where the registered (associated) processing module 40 is started-up, and processing is started. The processing from steps 252 to step 272 thereafter are the same as described above.

On the other hand, if it is judged in step 248 that the identifier expressing "execution ended" is held in the status region of the memory section 28, the routine moves on to step 270 where the processing results, of an amount corresponding to the unit of processing, which were requested in the input data request are transmitted to the connector 20 of the subsequent stage as input data, and the routine moves on to step 272. Processing are repeated in the order of steps 246, 248, 270, 272 until all of the processing results are transmitted to the subsequent connector 20. As described above, for example, in a case in which the processing module 40 of the subsequent stage processes the data which is the object of processing in a unit of processing which is divided minutely, or the like, the input data request is outputted from the processing module 40 of the subsequent stage per that unit of processing. Therefore, the processing of steps 246, 248, 270, 272 are carried out repeatedly until processing of all of the data which is the object of processing is completed.

When it is judged in step 250 that NULL is set in the ID region (i.e., that there is no association with the processing module 40), in step 274, forwarding processing, which forwards the input data request received from the connector 20 of the subsequent stage to the connector 20 of the preceding stage, is carried out.

Figure 9:
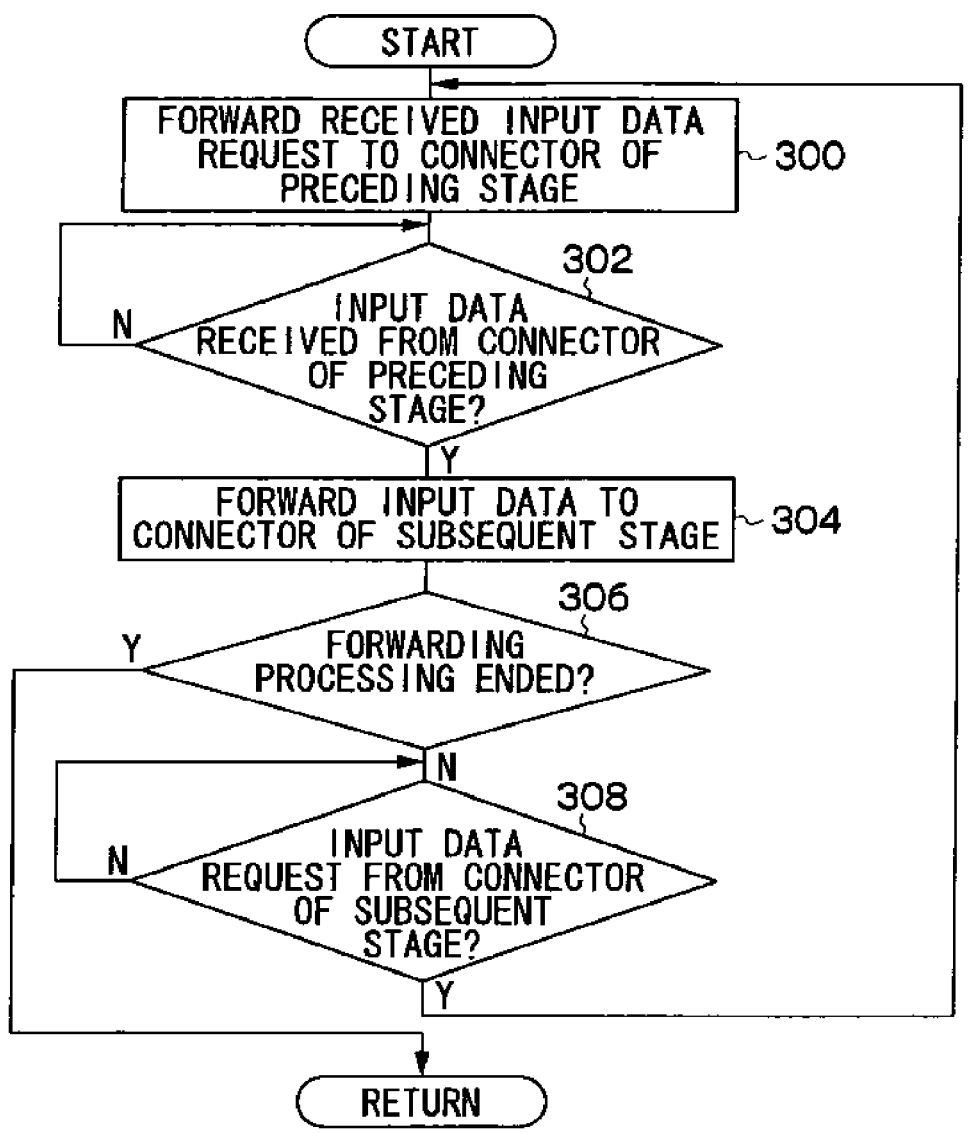
FIG. 9 is a flowchart showing the detailed flow of a transfer processing subroutine.

FIG. 9 is a flowchart showing the detailed flow of a forwarding processing subroutine.

In step 300, the input data request received from the connector 20 of the subsequent stage is forwarded to the connector of the preceding stage. In step 302, the connector 20 waits for receipt of input data from the connector 20 of the preceding stage. Here, when it is judged that the input data is received, in step 304, the received input data is forwarded to the connector 20 of the subsequent stage.

In step 306, it is judged whether or not the forwarding processing subroutine has ended. For example, if an identifier expressing the end of the data is attached to the input data which is transmitted and received, the judgment of the end can be carried out by referring to this identifier. For example, if the processing module 40 of the connector 20 of the subsequent stage processes all of the data by repeating processing in minutely-divided units of processing without processing all of the data which is the object of processing at one time, the forwarding of the input data in these minutely-divided units of processing is repeated until forwarding of all of the data has ended (i.e., until the data end identifier is recognized).

When it is judged in step 306 that the forwarding of all of the data which is the object of processing is not completed and the forwarding processing subroutine cannot be ended, in step 308, the connector 20 waits for receipt of an input data request from the connector 20 of the subsequent stage. When it is judged here that an input data request is received, the routine returns to step 300, and the above-described processing are repeated.

When it is judged in step 306 that the forwarding processing subroutine is to be ended because the forwarding of all of the data which is the object of processing is completed, the present subroutine is ended.

When this forwarding processing is executed, the connectors 20 are skipped in the linked structure.

Note that, in the present exemplary embodiment, NULL is not set in the ID regions of the lead connector and the final end connector. Therefore, in a case in which the connector 20 is the final end connector (a case in which the judgment in step 244 is affirmative), the judgment as to whether there is or is not association with the processing module 40 is omitted.

A case of executing processing by the pipeline method has been described above as an example. However, even in cases in which the processing modules are started-up from the final end connector, the processing modules can be executed in the optimal order of execution.

A concrete example will be described next.

Figure 10:
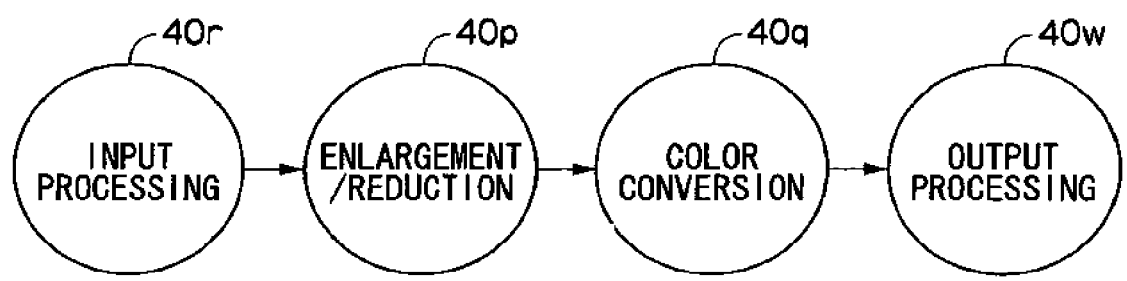
FIG. 10 is a diagram schematically showing the structure of an image processing system in which plural processing modules are linked and executed.

There will be described, as an example, an image processing system which reads-in image information from a file on a disk, carries out enlargement/reduction to an appropriate size, subjects the image information to color conversion processing, and thereafter, outputs the image information to a file on a disk. FIG. 10 is a diagram schematically showing the structure of this image processing system.

As shown in FIG. 10, the image processing system is structured such that four processing modules 40r, 40p, 40q, 40w, which are "input processing", "enlargement/reduction processing", "color conversion processing", and "output processing", are linked in series. When the linked structure of such an image processing system is built and executed by using the connectors 20, procedures such as follows are carried out.

First, the generation of connectors 20c1, 20c2, 20c3, 20c4 (refer to FIG. 11A), which correspond to the four processing modules 40r, 40p, 40q, 40w for which execution in continuation is desired, is instructed via the instructing section 12. Further, arbitrary identifying names (in FIG. 10, "read", "proc1.", "proc2", "write") are set for the respective connectors 20. Moreover, the connectors 20c1, 20c2, 20c3, 20c4 are defined so as to be linked in series in accordance with the structure of the aforementioned series of image processing. After defining the linked structure, the associations of the respective processing modules 40r, 40p, 40q, 40w with respect to the respective connectors 20c1, 20c2, 20c3, 20c4 are defined.

After the linked structure and associations have been defined in this way, a linking execution instruction, which is for actually building the linked structure of the processing modules and executing the processing modules, is inputted. In this way, the generated four connectors 20c1, 20c2, 20c3, 20c4 execute a processing routine such as that shown in above-described FIG. 4, judge the linking information included in the linking execution instruction, build the linked structure, and execute the processing of the processing modules 40 in the optimal order.

FIGS. 11A through 11D and FIGS. 12A and 12B are diagrams schematically showing the procedures of building the linked structure. FIGS. 13A through 13E and FIGS. 14A through 14E are diagrams schematically showing the procedures of execution of the processing modules.

Figure 11A:
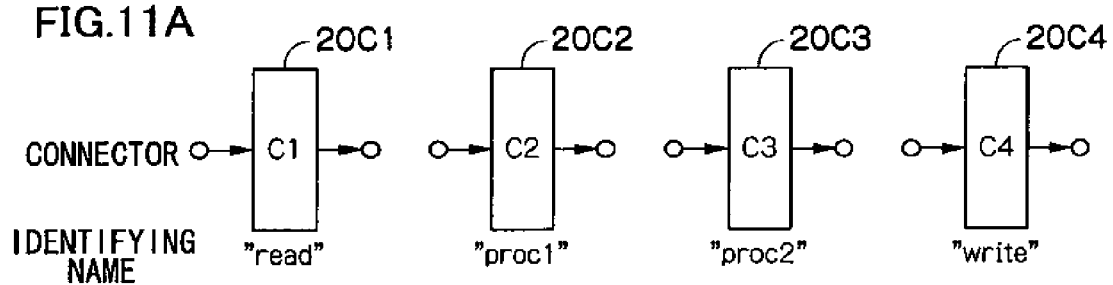
FIGS. 11A through 11D are diagrams schematically showing the order of building the linked structure shown in FIG. 10.
Figure 11B:
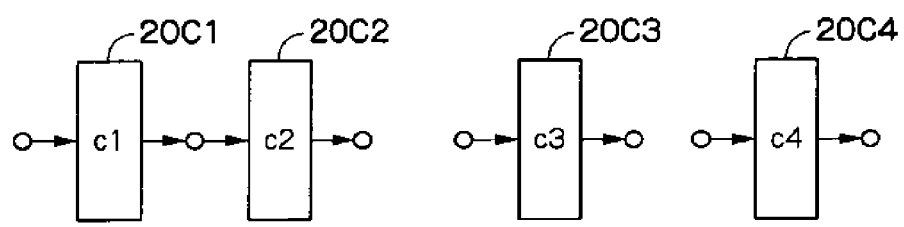
Figure 11C:
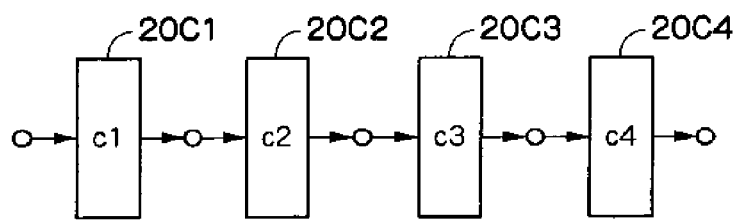

After the connectors 20c1, 20c2, 20c3, 20c4 are generated and identifying names are set for the respective connectors as shown in FIG. 11A, the connector 20c2 is linked to the connector 20c1 as shown in FIG. 11B, and the connector 20c2 and the connector 20c3, and the connector 20c3 and the connector 20c4, are linked as shown in FIG. 11C. As described above, this linking is carried out by setting the identifying names of the connectors 20 which are to be linked to the input side linking sections 24 and output side linking sections 26.

Figure 11D:
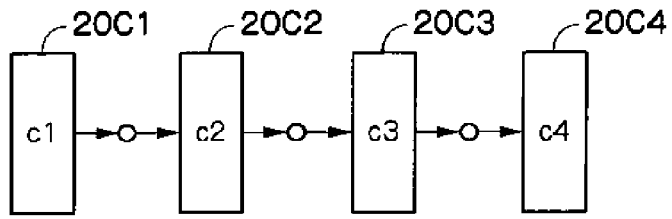

Further, because the connector 20c1 is the lead connector, linking of the input side thereof is unnecessary. Because the connector 20c4 is the final end connector, linking of the output side thereof is unnecessary. Accordingly, as shown in FIG. 11D, the linked relationships of the input side linking section 24 of the connector 20c1 and the output side linking section 26 of the connector 20c4 are set to null states (NULL).

Figure 12A:
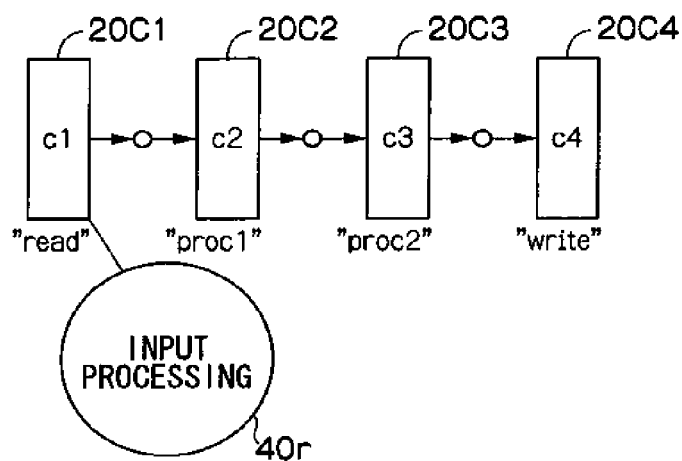
FIGS. 12A and 12B are diagrams schematically showing the order of associating the processing modules shown in FIG. 10.
Figure 12B:
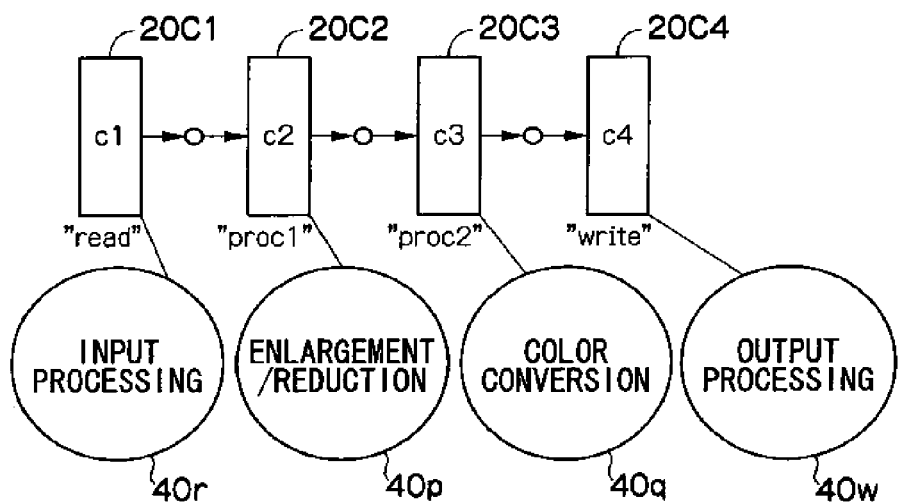

After the linked structure between the connectors 20 is built, as shown in FIG. 12A, associating of the "input processing" processing module 40r is carried out at the connector 20c1. As described previously, this associating is carried out by registering the ID of the "input processing" processing module 40r in the ID region of the memory section 28 of the connector 20c1. Similarly, as shown in FIG. 12B, associating of the "enlargement/reduction processing", "color conversion processing", "output processing" processing modules 40p, 40q, 40w is carried out with respect to the other connectors 20c2, 20c3, 20c4.

Next, execution of the processing modules 40r, 40p, 40q, 40w is started. If the execution of the processing modules 40r, 40p, 40q, 40w is carried out by the bucket-relay method, a processing routine such as shown in above-described FIG. 6 is executed.

Specifically, first, as shown in FIG. 13A, the connector 20c1 sends an initialization/execution instruction to the input processing module 40r associated with itself. After initialization, the input processing module 40r reads-in image information of an input image from a file on a disk, and transfers the read-in input image information to the connector 20c1 as processing results. The connector 20c1 acquires the input image information from the processing module 40r, and as shown in FIG. 13B, sends it to the connector 20c2 of the subsequent stage.

Next, as shown in FIG. 13C, the connector 20c2 sends an initialization/execution instruction to the enlargement/reduction processing module 40p associated with itself, and transfers the input image information received from the connector 20c1 to the enlargement/reduction processing module 40p. After initialization, the enlargement/reduction processing module 40p carries out enlargement/reduction processing on the received input image information, and sends these processing results (processed image information A) to the connector 20c2. The connector 20c2 acquires the processed image information A from the enlargement/reduction processing module 40p, and sends it to the connector 20c3 of the subsequent stage.

Next, as shown in FIG. 13D, the connector 20c3 sends an initialization/execution instruction to the color conversion processing module 40q associated with itself, and transfers the processed image information A received from the connector 20c2 to the color conversion processing module 40q. After initialization, the color conversion processing module 40q carries out color conversion processing on the processed image information A, and sends these processing results (processed image information B) to the connector 20c3. The connector 20c3 acquires the processed image information B from the color conversion processing module 40q, and sends it to the connector 20c4 of the subsequent stage.

Figure 13E:
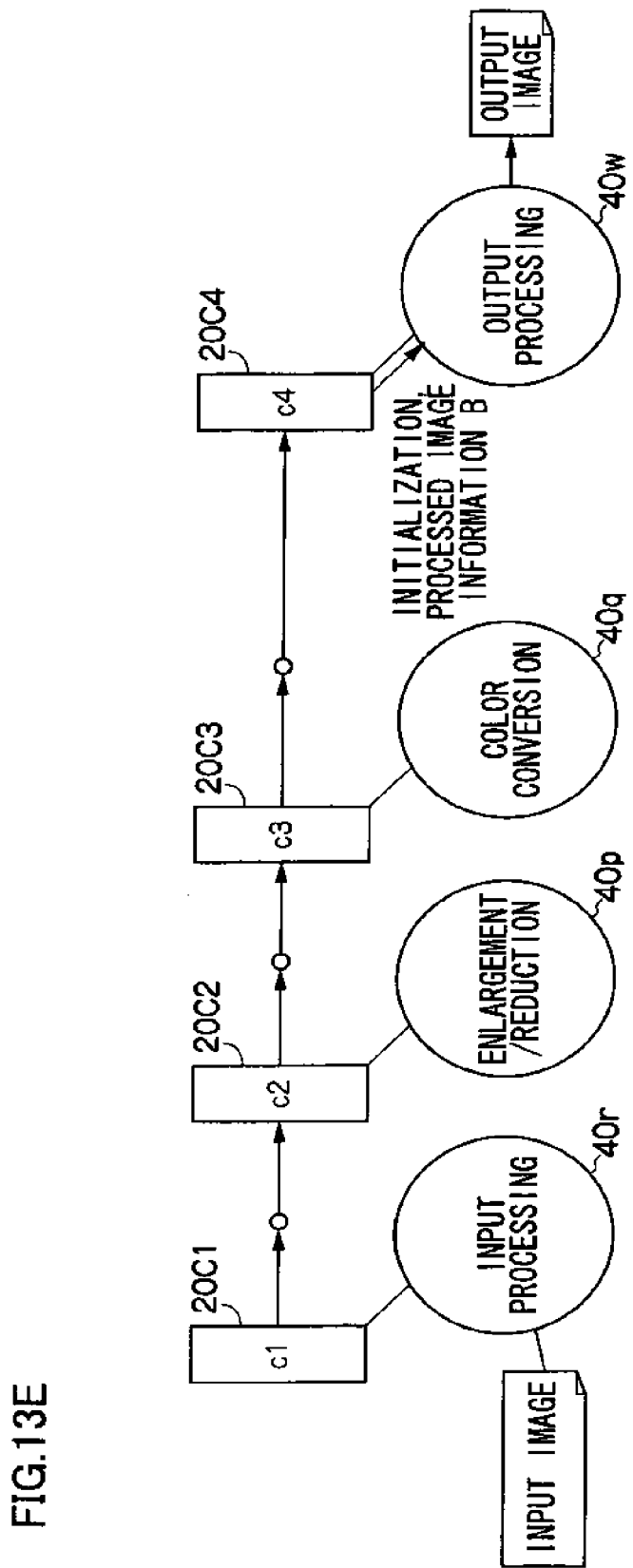

Next, as shown in FIG. 13E, the connector 20c4 sends an initialization/execution instruction to the output processing module 40w associated with itself, and transfers the processed image information B received from the connector 20c3 to the output processing module 40w. After initialization, the output processing module 40w outputs the processed image information B to a file on a disk.

If the execution of the processing modules is carried out by the pipeline method, a processing routine such as shown in above-described FIG. 8 is executed.

Specifically, first, as shown in FIG. 14A, the connector 20c4 which is the final end connector sends an initialization/execution instruction to the output processing module 40w associated with itself. After initialization, the output processing module 40w requests the connector 20c4 for input data needed in order to carry out the output processing. Note that, in the present example, it can be considered that call-back functions or input buffer objects or the like are transferred from the respective connectors 20 to the respective processing modules 40 at the times of the initialization instructions of the processing modules 40, or the like.

Figure 14C:
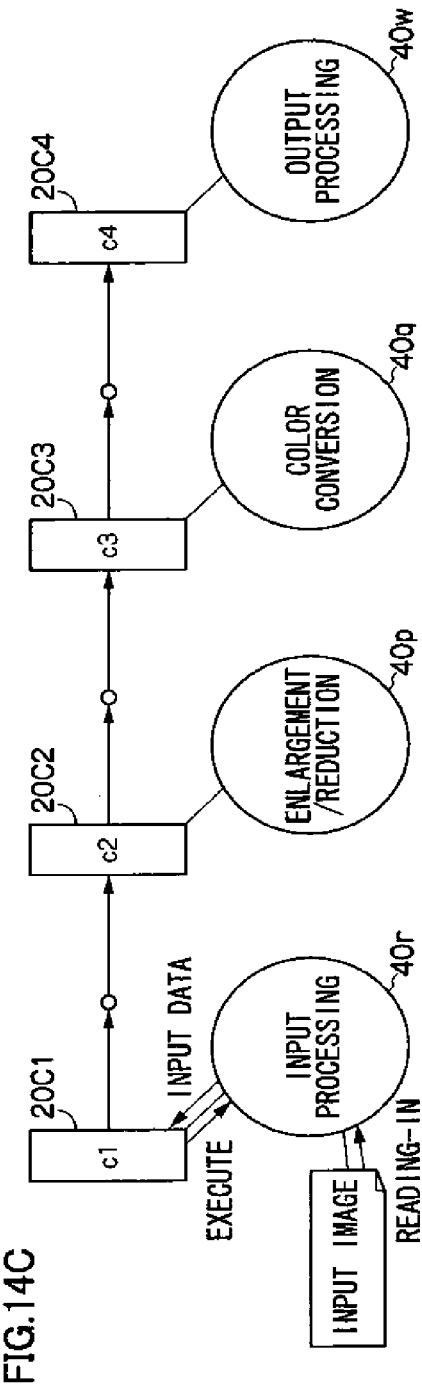

As shown in FIG. 14B, the connector 20c4, which has received the input data request, requests the connector 20c3 for input data. The connector 20c3 which has received the input data request sends an initialization/execution instruction to the color conversion processing module 40q. The color conversion processing module 40q requests the connector c3 for input data needed in order to carry out color conversion processing. Similarly, input data requests are sent upstream in the order of the connectors 20c2, 20c1. Finally, the connector 20c1 which is the lead connector receives an input data request from the connector 20c2, and as shown in FIG. 14C, sends an initialization/execution instruction to the input processing module 40w.

The input processing module 40w reads-in the input image, and transfers the data of the read-in input image to the connector 20c1 as processing results. Moreover, in accordance with the input data request from the connector 20c2, the connector 20c1 sends the processing results, which were acquired from the input processing module 40w, to the connector 20c2 as input data.

Figure 14D:
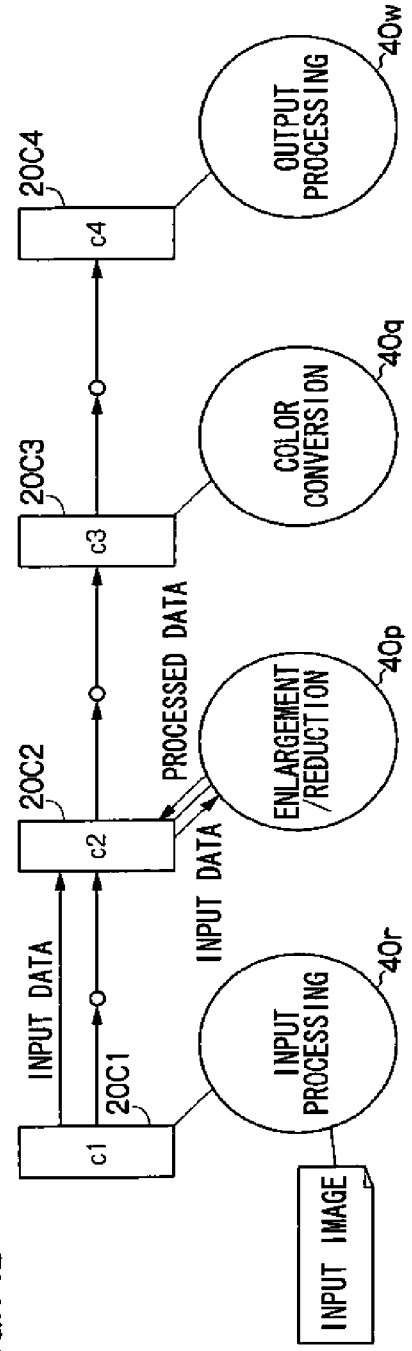

As shown in FIG. 14D, the connector 20c2 transfers the input data acquired from the connector 20c1 to the enlargement/reduction processing module 40p. The enlargement/reduction processing module 40p carries out enlargement/reduction processing on the acquired input data, and returns the processed data to the connector 20c2. Further, in accordance with the input data request from the connector 20c3, the connector 20c2 sends the processed data acquired from the enlargement/reduction processing module 40p.

Figure 14E:
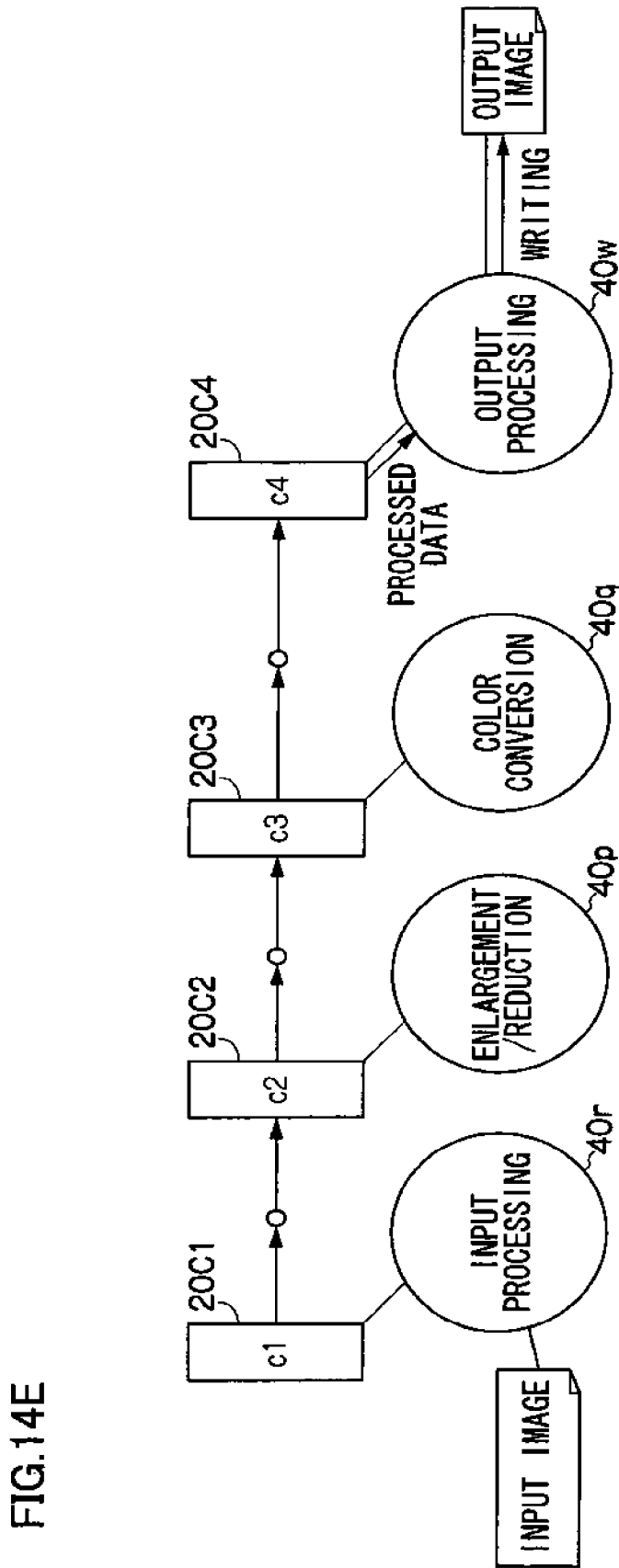

Similarly, the connector 20c3 executes the processing of the color conversion processing module 40q by using the input data acquired from the connector 20c2, and sends the processed data to the connector 20c4. As shown in FIG. 14E, the connector 20c4 executes output image writing processing of the output processing module 40w by using the input data acquired from the connector 20c3.

Note that, by building a linked structure by the connectors 20, it is possible to easily customize the linked structure which has been built once, such as changing the order of execution or the types of the processing modules 40, or not executing and skipping a processing module, or the like, by changing only the associations and without modifying the linked structure itself. Specifically, at the time of generating a connector, the connector 20 is generated so as to include a program of a processing routine which is executed at the time when a change instruction is inputted from the instructing section 12. After the linked structure is built, when a change instruction is inputted, the connector 20 changes the association not the basis of the change instruction.

A more specific example will be described hereinafter.

Figure 15A:
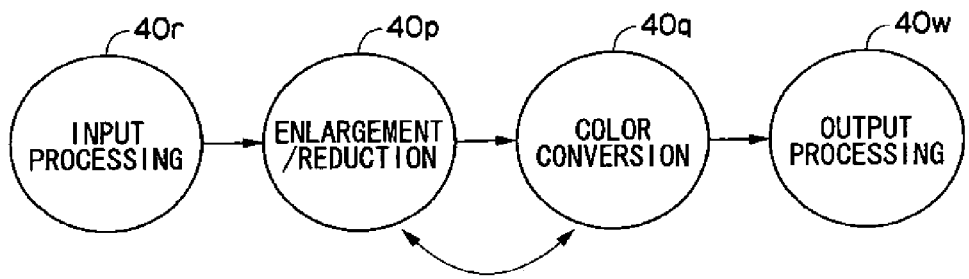
FIGS. 15A through 15C are diagrams schematically showing procedures in a case of changing the execution order of the processing modules.

In a case of carrying out enlargement processing on inputted image data in the image processing system shown as an example in FIG. 10, carrying out color conversion processing before the enlargement processing is achieved by a smaller size of the image data which is the object of the color conversion processing, and therefore, the processing efficiency is better. Namely, depending on the data which is the object of processing, there are cases in which it is better to rearrange the order of execution of the processing modules 40. Thus, as shown in FIG. 15A, in a case of switching the order of execution of the enlargement/reduction processing module 40p and the color conversion processing module 40q, first, a change instruction to change the associations of the processing modules 40 with respect to the linked structure which has already been built, is inputted from the instructing section 12. When this change instruction is inputted, the respective connectors 20 change the settings of the processing modules 40 associated with themselves as follows in accordance with the inputted change instruction.

Figure 15B:
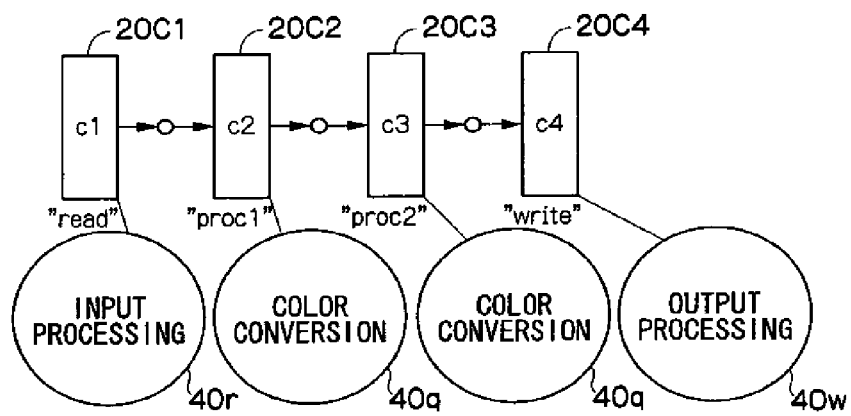
Figure 15C:
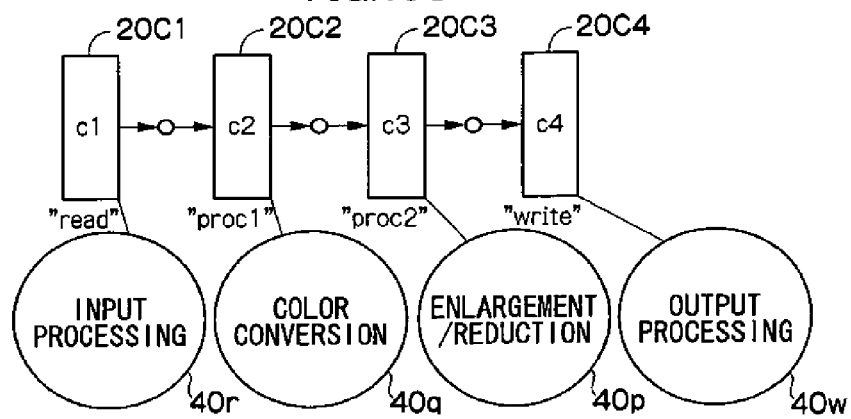

As shown in FIG. 15B, the connector 20c2 registers, in the ID region of its own memory section 28, the ID of the color conversion processing module 40q in place of the ID of the enlargement/reduction processing module 40p. Further, as shown in FIG. 15C, the connector 20c3 registers, in the ID region of its own memory section 28, the ID of the enlargement/reduction processing module 40p in place of the ID of the color conversion processing module 40q.

In this way, the order of execution of the processing modules 40 can be changed easily merely by changing the associations, and without rebuilding the linked structure.

Figure 16A:
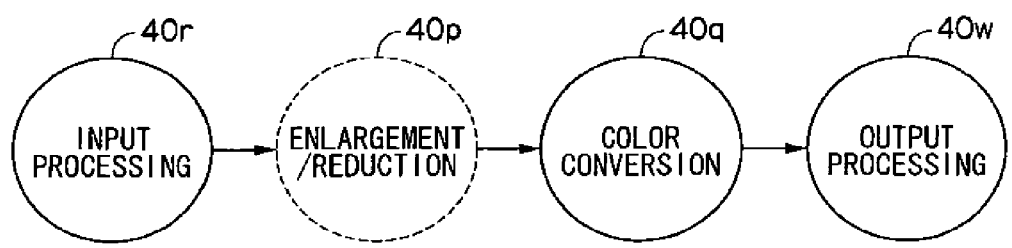
FIGS. 16A and 16B are diagrams schematically showing procedures in a case of invalidating a processing module associated with a connector.
Figure 16B:
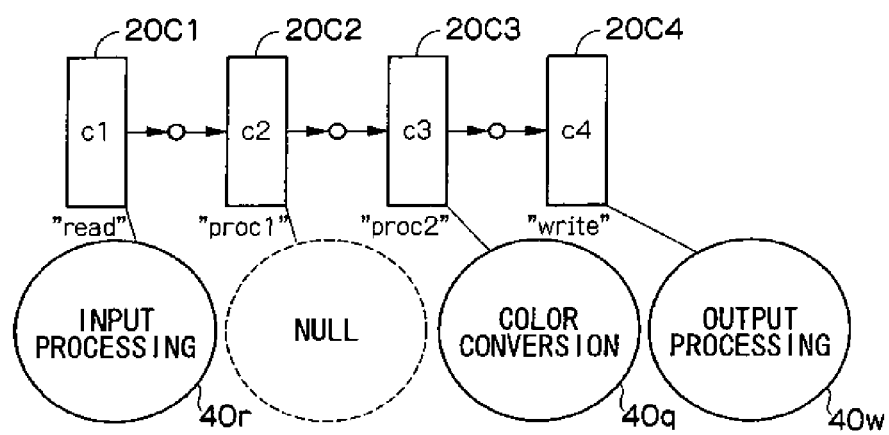

Further, in the image processing system shown as an example in FIG. 10, in a case in which an inputted image coincides with an image size which is already an object, the "enlargement/reduction" processing is not needed. Therefore, as shown in FIG. 16A, the enlargement/reduction processing can be omitted (skipped). In this case as well, as shown in FIG. 16B, an invalidating value (NULL) is set in the ID region of the memory section 28 of the connector 20c2 in accordance with a change instruction from the instructing section 12. In this way, removal of the enlargement/reduction processing module 40p from the linked structure can be carried out without rebuilding the linked structure.

Figure 17A:
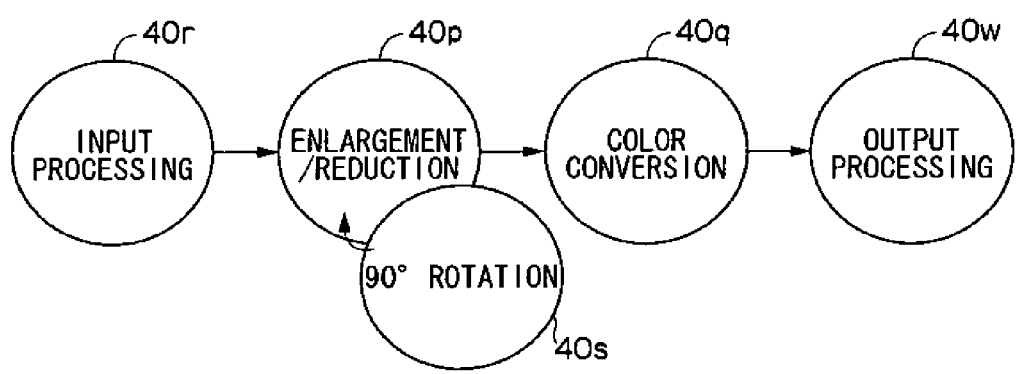
FIGS. 17A and 17B are diagrams schematically showing procedures in a case of changing a processing module.
Figure 17B:
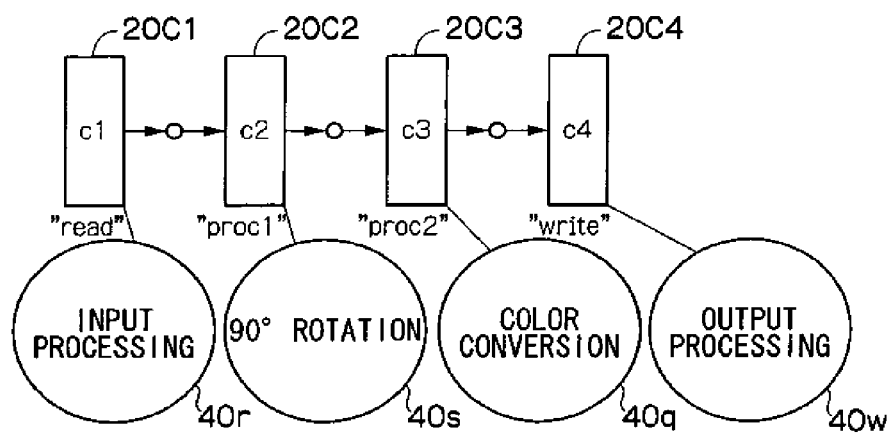

Moreover, in the image processing system shown as an example in FIG. 10, in a case in which it is desired to carry out 90° rotation processing on the inputted image instead of the enlargement/reduction processing as shown in FIG. 17A, the ID registered in the ID region of the memory section 28 of the connector 20c2 is changed from the ID of the enlargement/reduction processing module 40p to the ID of a 90° rotation processing module 40s as shown in FIG. 17B. In this way, the 90° rotation processing module 40s can be executed instead of the enlargement/reduction processing module 40p, without rebuilding the linked structure.

Still further, by building the linked structure by using the connectors 20, a complex processing flow in which "branching" and "merging" are included also can be built easily.

For example, in the case of building an image processing system which extracts only the face portion of a person from a photographed image in which a person is photographed, and which carries out brightness correction processing only on the extracted face portion, a linked structure such as shown in FIG. 18 can be considered. First, the input processing module 40r is executed and the image data of the input image is read-in. Thereafter, this inputted image data is sent to a face detection processing module 40f and to a brightness correction processing module 40b, respectively. The face detection processing module 40f detects the face portion of a person from the inputted image data, and a mask image preparing processing module 40m generates a mask image of the detected face portion. On the other hand, in parallel with these processing, the brightness correction processing module 40b carries out brightness correction on the inputted image data. The processing results of the mask image preparing processing module 40m and the processing results of the brightness correction processing module 40b are transmitted to a merging processing module 40c, and the respective processing results are merged at the merging processing module 40c. At the output processing module 40w which is the final stage, the processing results (image data) merged at the merging processing module 40c are outputted.

An image processing system, which has a complex linked structure such as branching or merging or the like in this way, can be built as follows by using the connectors 20.

First, as shown in FIG. 19A, connectors 20c1 through 20c6 corresponding to the respective processing modules 40 are generated in accordance with an instruction from the instructing section 12. Identifying names such as those which are illustrated are set for the respective connectors 20c1 through 20c6. The numbers of the input side linking sections 24 and the output side linking sections 26 of the respective connectors 20c1 through 20c6 are defined and set via the instructing section 12. Specifically, because linked structures such as branching and merging and the like are included, the number of output side linking sections 26 of the connector 20c1 which is the source of the branching is defined so as to be two, and the number of input side linking sections 24 of the connector 20c5 which is the destination of merging is defined so as to be two. For the others, the numbers are defined as those (one) of the basic model as is.

Next, as shown in FIG. 19B, at the respective connectors 20c1 through 20c6 which have been generated, the identifying names of the adjacent connectors 20 are set at the input side linking sections 24 and the output side linking sections 26 of the connectors 20c1, 20c2, 20c3, 20c5, 20c6 which build the flow at the upper side, and these connectors 20 are linked together.

Then, as shown in FIG. 20A, the identifying name of the connector 20c4 is set at the second (the unset one at this point in time) output side linking section 26 of the connector 20c1 which is the source of branching, and the connector 20c1 is linked with the connector 20c4.

Then, as shown in FIG. 20B, the identifying name of the connector 20c4 is set at the second (the unset one at this point in time) input side linking section 24 of the connector 20c5 which is the destination of merging, and the connector 20c5 is linked with the connector 20c4.

The connectors 20c1 through 20c6 then associate the processing modules 40 with themselves. The associating of the processing modules 40 is carried out, in the same way as described above, by the connectors 20c1 through 20c6 registering the IDs of the associated processing modules 40r, 40f, 40m, 40c, 40b, 40w in the ID regions of the memory sections 28 of the respective connectors 20c1 through 20c6.

The processing modules 40r, 40f, 40m, 40c, 40b, 40w, which are associated with the respective connectors 20c1 through 20c6, are executed in the optimal order in accordance with the linked state as explained in FIG. 6 and FIG. 8. Note that, because branching and merging structures are included in the linked structure here, processing are carried out as follows at the places of branching and merging. The connector 20c1 which is the source of branching sends the input image data, which was read-in at the input processing module 40r, to both of the plural connectors 20c2, 20c4 which are linked at the subsequent stage. After the branching, processing is carried out in parallel at the system of the connectors 20c2, 20c3, and at the system of the connector 20c4. The connector 20c5 which is the destination of merging waits for the processing results from the two connectors 20c3, 20c4 linked to the input side linking sections 24 thereof (or, waits for execution ended identifiers to be stored in the status regions of the connectors 20c3, 20c4), and executes the merging processing module 40c. In this way, the respective flows can be made to be synchronous.

Figure 21:
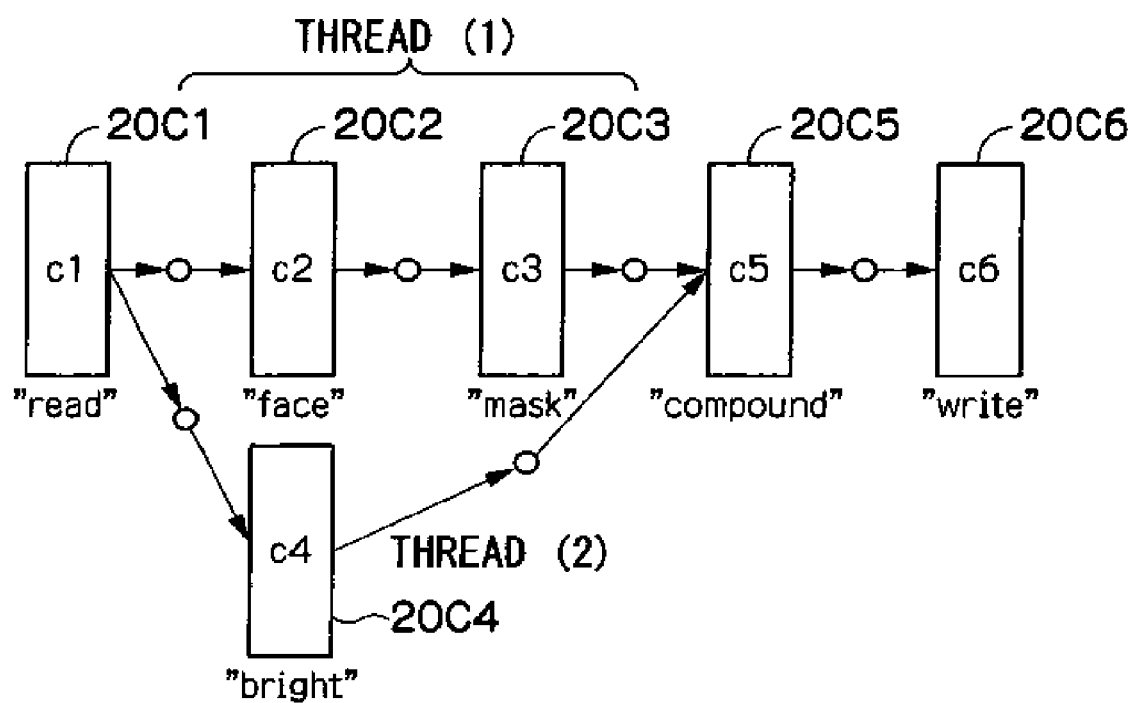
FIG. 21 is a diagram schematically showing the procedures of executing the image processing system shown in FIG. 18.

By building branching/merging structures by using the connectors in this way, as shown in FIG. 21, the connectors 20c2, 20c4, which are linked to the output side linking sections 26 of the connector 20c1, are started-up in separate threads, and the connector 20c4 and the flow of the connectors 20c2, 20c3 can be executed in parallel. Therefore, control is easy even in cases in which a system of a series of processing is branched into plural flows, and it is desired to execute the respective flows as parallel processing by independent threads or at separate CPUs.

Note that it is possible to build a branched flow which proceeds to the next processing when the processing results of the thread which ends quickest among plural branched threads is received. In this case, the linked structure is built in the same way as described above, but the connector 20 which is the merging destination itself is structured so as to execute the processing module 40 associated with itself by using only the processing results which are received first. Moreover, a structure may be employed in which a force end instruction for forcibly ending execution of processing is outputted to the connectors 20 which are linked to the input side linking sections 24 and correspond to the threads other than the quickest thread. In accordance therewith, the connectors 20 which receive the force end instruction can forcibly end the processing modules 40 which are being executed.

Note that parallel processing is not only synchronous control such as described above, and, depending on the processing contents, there are cases in which conflict/exclusive control is needed. In such cases as well, if the linked structure is built by using the connectors 20, control can be carried out easily.

Figure 22:
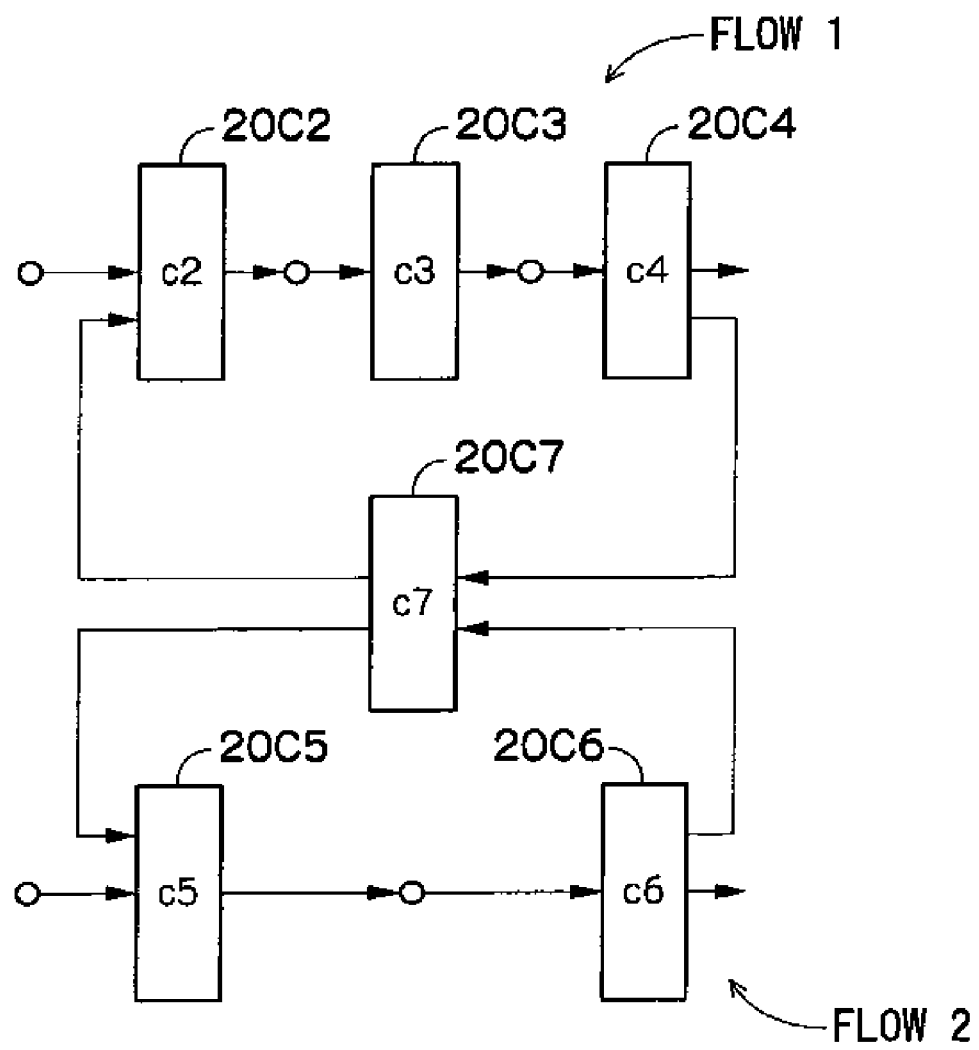
FIG. 22 is a diagram showing an example of building a linked structure of a conflict avoiding flow using a semaphore model.

FIG. 22 is an example of building a linked structure of a conflict avoiding flow by using a semaphore model. Flow 1 of connectors 20c2, 20c3, 20c4, and flow 2 of connectors 20c5, 20c6, are disposed in parallel. Flow 1 and flow 2 use common resources of the processing device 10. The output side linking sections 26 of the final connectors 20c4, 20c6 of the respective flows are linked to the input side linking section 24 of a connector 20c7. The output side linking sections 26 of the connector 20c7 are linked to the input side linking sections 24 of the lead connectors 20c2, 20c5 of the respective flows.

The connector 20c7 functions as a semaphore, and outputs a processing start instruction to either one flow of the flows 1, 2. When processing results (or a processing end notice) are outputted from that one flow to the connector 20c7, the connector 20c7 this time outputs a processing start instruction to the other flow. In this way, conflict can be avoided.

By utilizing the connectors in this way, conflict/exclusive control can be carried out easily.

Further, in the present exemplary embodiment, it is possible to re-use (re-execute) a linked structure which has been linked and at which execution has already ended. In the case of re-use, due to a re-execution instruction from the instructing section 12, the above-described processing module executing processing subroutine is again executed by the respective connectors 20. In this case, there is no need to execute the initialization processing subroutine which carries out building of the linked structure and associating of the processing modules. In this way, the respective processing modules 40 are re-initialized, and the processing modules 40 can be re-executed in the optimal order of execution.

Figure 23:
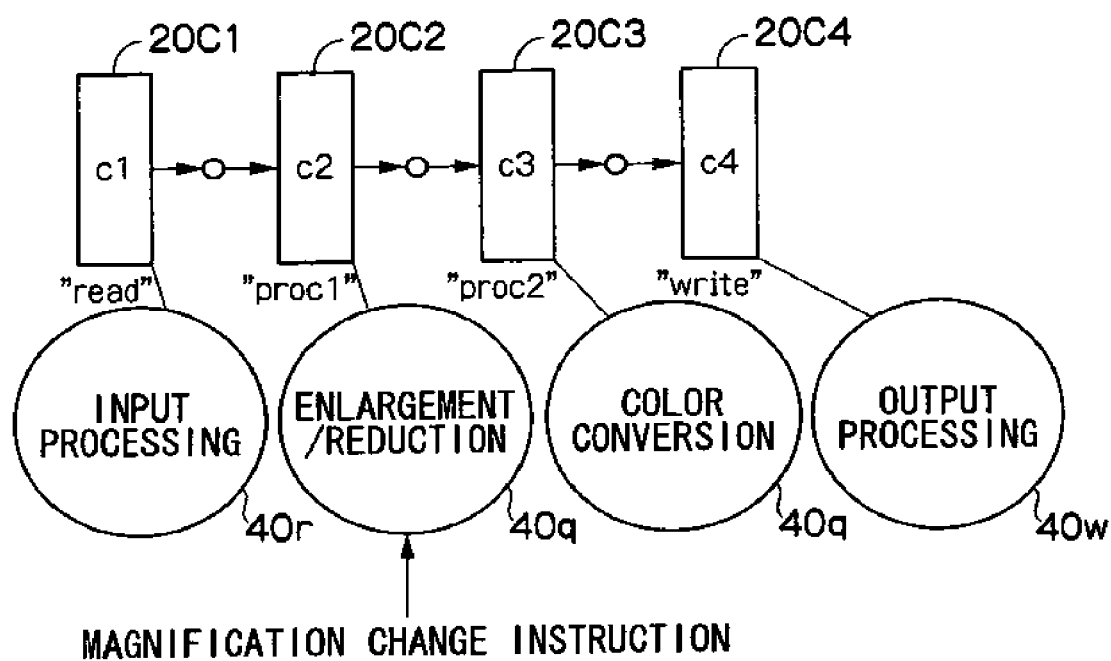
FIG. 23 is a diagram explaining changing of parameters with respect to a processing module in a case in which a linked structure is re-used.

Note that, when it is desired to change the parameters particular to the processing module 40, for the processing module 40 which is already associated with the corresponding connector 20, the parameters are directly re-set via an interface which is particular to that processing module. For example, in the image processing system shown as an example in FIG. 10, when it is desired to change the magnification of the enlargement/reduction of the enlargement/reduction processing module 40p, as shown in FIG. 23, a magnification change instruction is given from the instructing section 12 via an interface which is particular to the enlargement/reduction processing module 40p. Namely, the change instruction is carried out by an interface separate from the building of the linked structure and the associating of the processing modules. In this way, the setting of the parameters of the respective processing modules can be carried out separately from the building of the linked structure and the associating of the processing modules. Accordingly, parameter changes for the respective processing modules 40 are easy, and re-use of the linked structure also is easy.

Moreover, as described in the above embodiment, if information of the built linked structure and information of the associations are stored in the linked structure description file 14, the processing of a same linked structure can be reproduced and executed at any time. In addition, a linked structure, which is similar to a linked structure which was built in the past, can be built efficiently.

Figure 24:
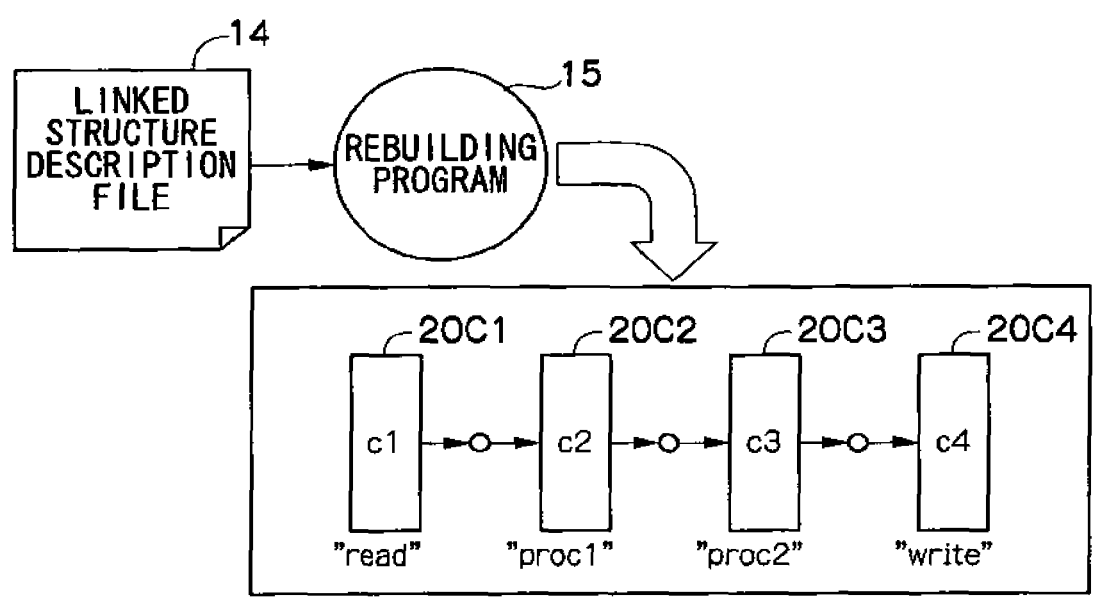
FIG. 24 is a diagram explaining an example of a case in which information of a linked structure stored in a linked structure description file is re-used.

For example, as shown in FIG. 24, a rebuilding program 15, which can directly edit data which is stored in the linked structure description file 14, is provided at the processing device 10 or at the connector 20. By this rebuilding program 15, linked structure information and association information, which are stored in the linked structure description file 14, can be directly edited, and the building of the linked structure can be realized without programming.

For example, if a linked structure which is prepared in advance as a prototype is stored in the linked structure description file 14, a similar linked structure can be easily built by utilizing this stored prototype linked structure. In a case in which no editing whatsoever is carried out, the stored linked structure can be reproduced as is.

In accordance with such a structure, a linked structure can be built efficiently. In particular, even better results are expected in complex cases such as repeating branching/merging.

Note that, in the above-described exemplary embodiment, in the initialization processing, the connector 20 writes the linked structure information and the association information of the processing module 40 to the linked structure description file 14. However, the aspect of the present invention is not limited to the same. The instructing section 12 may write the linked structure and association information to the linked structure description file 14 at the time when the linked structure or association is instructed at the instructing section 12.

Further, the linked structure description file 14 may be provided within the processing device 10 as in the above-described exemplary embodiment, or may be provided at the exterior thereof. When the linked structure description file 14 is provided at the exterior, a structure can be employed in which data can be transferred via a network.

Moreover, the above exemplary embodiment describes, as an example, a case in which the generated connectors 20 themselves carry out building of the linked structure and associating of the processing modules. However, the aspect of the present invention is not limited to the same. For example, the processing device 10 may carry out the building of the linked structure and the associating of the processing modules 40 with the connectors 20. In this case, the connectors 20 only carry out control of execution of the processing modules after the linked structure is built.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

According to an aspect of the invention, there is provided a processing device including: plural processing modules executing a processing; and plural connectors each having a linking section able to link with at least one other connector at an input side or an output side, an associating section for associating the connector with one of the processing modules, and a controller recognizing a linked state with other connectors and, in accordance with the linked state, controlling the processing module associated by the associating section.

The connector of the processing device can be structured by software or hardware, is linked with other connectors by the linking section, and is associated with a processing module by the associating section. Further, the controller of the connector controls the associated processing module in accordance with the linked state with other connectors.

In this way, because the linked structure of the processing modules is built by the linking of connectors, the connection relationship between the processing modules is estranged, and replacement or changing of the respective processing modules is easy. Moreover, in the same way as in a conventional case in which plural processing modules are linked directly, the processing modules can be executed in an optimal order.

Moreover, even in complex linked structures such as parallel processing (processing in which plural flows are executed in parallel), the linked structure can be built easily by linking the connectors to one another. Further, the control of execution of the processing module can be carried out at the connector side and not at the processing module side. Therefore, for example, although parallel processing and the like require consideration of controls such as synchronous, conflict, exclusive, and the like, there is no need to recognize these at the processing module side, and controls such as synchronous, conflict, exclusive, and the like are easy.

When the controller recognizes that the connector is linked with at least one other connector at the output side, the controller may control execution of processing of the processing module associated by the associating section, and output processing results of the processing module to the linked other connector.

In this way, the processing results of the processing module associated with the connector can be outputted to the connector of the subsequent stage. The processing module associated with the connector of the subsequent stage can carry out processing by using these processing results.

When the controller recognizes that the connector is linked with at least one other connector at the input side, the controller may control the processing module associated by the associating section such that the processing is carried out according to a processing result acquired from the other connector linked to the input side.

In this way, the connector can acquire processing results of the processing module associated with the connector of the preceding stage. The controller of the connector can control the processing module associated with itself to carry out processing by using these processing results.

When the controller recognizes that the connector is linked with at least one other connector at the input side and the output side, the controller may control the processing module associated by the associating section such that the processing is carried out according to a processing result acquired from the other connector linked to the input side, and the controller may output processing results of the processing module to the other connector that is linked to the output side.

In this way, the connector, which is associated with a processing module which carries out an intermediate processing among the series of processing, can cause the processing module associated with itself to carry out processing by using the processing results of the processing module associated with the connector of the preceding stage. Further, because the connector can output the processing results associated with itself to the connector of the subsequent stage, the processing module associated with the connector of the subsequent stage can carry out processing according to the processing result.

When the controller recognizes that the connector is linked with plural other connectors at the input side, the controller may carry out control such that processing of the associated processing module is not started until the processing of all of the processing modules associated with the plural other connectors has ended.

Controlling the processing of the processing module in this way is effective, for example, in a case in which the respective connectors are linked such that parallel processing are carried out by plural processing modules, and the processing module which is the destination of merging of the parallel processing carries out processing by using all of the processing results of the respective processing modules of the parallel processing.

When the controller recognizes that the connector is linked with at least one other connector at the input side and the output side, and the controller recognizes that a processing module has not been associated through the associating section or recognizes that the associated processing module is inappropriate, the controller may output a processing result, that is acquired from the other connector linked to the input side, to the other connector linked to the output side automatically.

Depending on the data which is the object of processing, there are cases in which it is desired to skip a portion of the linked processing modules (i.e., desired to omit a processing). In this case, if a processing module is not associated by the associating section, or if the associated processing module is made invalid, the connector can output the processing results, which were received from the connector of the preceding stage, to the connector of the subsequent stage as is without processing the processing results. A portion of the processing can thereby be omitted, without stopping the series of processing by the plural processing modules.

The processing device may further have an outputting section that outputs, to a memory device, linking information which corresponds to a linked structure between the respective connectors, and association information between the respective connectors and the processing modules.

Moreover, the processing device may further have a memory device that stores linking information and association information and a reproducing section that reads out linking information, which corresponds to a linked structure between the respective connectors, and association information between the respective connectors and the processing modules, from the memory device, and on the basis of the linking information and the association information that are read-out, the reproducing section reproduces linking through the linking sections of the respective connectors and associating through the associating sections.

In this way, it is easy to re-use and rebuild a linked structure which has been built once. Note that the reproducing section may be such that it not only reproduces a linked structure and associations of processing modules which are the same as a linked structure and associations which are stored, but also edits and reproduces these.

Each of the plural connectors may further have a status memory that stores a status of the associated processing module.

In this way, the state of execution of the processing module associated with each connector can be grasped, and input and output control of the processing results of the processing modules also is easy.

According to a second aspect of the invention, there is provided a processing method including: linking plural connectors each having a linking section able to link with at least one other connector at an input side or an output side, an associating section for associating the connector with one processing module which executes a processing, and a controller recognizing a linked state with other connectors and, in accordance with the linked state, controlling the processing module associated by the associating section; and executing the processing modules associated with the linked plural connectors, in an order in which the connectors are linked.

In the processing method of the present invention as well, because the linked structure of the processing modules is built by the linking of connectors, the connection relationship between the processing modules is sparse, and replacement or changing of the respective processing modules is easy. Moreover, in the same way as in a conventional case in which plural processing modules are linked directly, the processing modules can be executed in an optimal order.

Moreover, even in complex linked structures such as parallel processing (processing in which plural flows are executed in parallel), the linked structure can be built easily by linking the connectors to one another. Further, the control of execution of the processing module can be carried out at the connector side and not at the processing module side. Therefore, for example, although parallel processing and the like require consideration of controls such as synchronous, conflict, exclusive, and the like, there is no need to recognize these at the processing module side, and controls such as synchronous, conflict, exclusive, and the like are easy.

In accordance with the processing device and processing method relating to the present invention, there are the excellent effects that a linked structure can be built such that plural processing modules can be easily linked and executed, and a linked structure can be changed flexibly.

What is claimed is:

1. A processing method linking a plurality of connectors and executing a plurality of processing modules, the method comprising:
   defining linking with at least one other connector at an input side or an output side of each of the plurality of connectors;
   associating one of the processing modules with each of the plurality of connectors; and
   recognizing a linked state with other connectors, and controlling execution of the associated processing module.

2. The processing method of claim 1, wherein, when it is recognized that the connector is linked with at least one other connector at each of the input side and the output side, the controlling includes controlling the associated processing module such that the processing is carried out according to a processing result acquired from the other connector linked to the input side, and outputting the processing result of the processing module to the other connector that is linked to the output side.

3. The processing method of claim 1, wherein, when it is recognized that the connector is linked with a plurality of other connectors at the input side, the controlling includes carrying out control such that processing of the associated processing module is not started until the processing of all of the processing modules associated with the plurality of other connectors have ended.

4. The processing method of claim 1, wherein, when it is recognized that the connector is linked with at least one other connector at the input side and the output side and it is recognized that a processing module has not been associated, or it is recognized that the associated processing module is inappropriate, the controlling includes outputting a processing result, that is acquired from the other connector linked to the input side, to the other connector linked to the output side automatically.

5. The processing method of claim 1, wherein the method further comprises outputting, to a memory device, linking information which corresponds to a linked structure between the respective connectors, and association information between the respective connectors and the processing modules.

6. The processing method of claim 1, wherein the method further comprises:
   reading-out linking information, which corresponds to a linked structure between the respective connectors, and association information between the respective connectors and the processing modules, from a memory device that stores linking information and association information;
   linking at least one other connector to the input side or the output side of the connector, on the basis of the linking information that is read-out; and
   associating the connector with one of the processing modules, on the basis of the association information that is read-out.

7. A non-transitory computer readable medium storing a program causing a computer to execute a process for linking a plurality of connectors and executing a plurality of processing modules, the process comprising:
   defining linking with at least one other connector at an input side or an output side based on linking information which expresses a linked structure between the respective connectors of each of the plurality of connectors;
   associating one of the processing modules based on association information which expresses associations between the respective connectors and the processing modules with each of the plurality of connectors; and
   recognizing a linked state with other connectors, and controlling execution of the associated processing module.

* * * * *